US012354545B2

(12) United States Patent
Kim et al.

(10) Patent No.: US 12,354,545 B2
(45) Date of Patent: Jul. 8, 2025

(54) PIXEL INCLUDING FIRST THROUGH FOURTH TRANSISTORS AND DISPLAY DEVICE INCLUDING THE SAME

(71) Applicant: Samsung Display Co., Ltd., Yongin-Si (KR)

(72) Inventors: Kwi Hyun Kim, Yongin-si (KR); Se Hyun Lee, Yongin-si (KR); Jin Joo Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/383,323

(22) Filed: Oct. 24, 2023

(65) Prior Publication Data

US 2024/0212613 A1 Jun. 27, 2024

(30) Foreign Application Priority Data

Dec. 27, 2022 (KR) ........................ 10-2022-0185849

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861
See application file for complete search history.

(56) References Cited

U.S. PATENT DOCUMENTS 9,626,904 B2 4/2017 Kimura et al.
10,943,544 B2 3/2021 Lee et al.
(Continued)

FOREIGN PATENT DOCUMENTS

DE 11-2019-005892 T5 8/2021
JP 2021-128194 A 9/2021
(Continued)

OTHER PUBLICATIONS

Kei Kimura (SID Member), Yusuke Onoyama, Taizo Tanaka, Naobumi Toyomura (SID Member) and Hideyuki Kitagawa, "New pixel driving circuit using self-discharging compensation method for high-resolution OLED micro displays on a silicon backplane", Journal of the SID, vol. 25, Issue3, Apr. 18, 2017, 10 pages, Japan.

*Primary Examiner* — Lisa S Landis
(74) *Attorney, Agent, or Firm* — Innovation Counsel LLP

(57) ABSTRACT

A pixel includes a light emitting element, a first transistor having a first electrode connected to a first power line via a first node, a second electrode connected to a second power line via a second node and the light emitting element, and a gate electrode connected to a third node, a second transistor connected between a data line and the third node, and having a gate electrode connected to a first scan line, a third transistor connected between the first power line and the first node, and having a gate electrode connected to an emission control line, and a fourth transistor connected between the second node and a third power line. The second transistor is turned on after the fourth transistor is turned on and maintains a turn-on state during a predetermined period, and is turned off before the fourth transistor is turned off.

17 Claims, 17 Drawing Sheets

(52) U.S. Cl.
CPC . *G09G 2300/0861* (2013.01); *G09G 2310/02* (2013.01); *G09G 2320/045* (2013.01); *G09G 2330/028* (2013.01); *G09G 2330/12* (2013.01)

(56) References Cited

U.S. PATENT DOCUMENTS

| | | | | |
|---|---|---|---|---|
| 11,030,939 | B2 | 6/2021 | Park et al. | |
| 2018/0005572 | A1* | 1/2018 | Ka | G09G 3/3233 |
| 2021/0027702 | A1* | 1/2021 | Park | G09G 3/3266 |
| 2021/0287599 | A1* | 9/2021 | Kim | G09G 3/32 |

FOREIGN PATENT DOCUMENTS

| | | | |
|---|---|---|---|
| KR | 10-2019-0119693 | A | 10/2019 |
| KR | 10-2297000 | B1 | 9/2021 |
| KR | 10-2022-0093544 | A | 7/2022 |
| KR | 10-2416705 | B1 | 7/2022 |

* cited by examiner

PIXEL INCLUDING FIRST THROUGH FOURTH TRANSISTORS AND DISPLAY DEVICE INCLUDING THE SAME

This application claims priority to Korean Patent Application No. 10-2022-0185849, filed on Dec. 27, 2022, and all the benefits accruing therefrom under 35 U.S.C. § 119, the content of which in its entirety is herein incorporated by reference.

BACKGROUND

1. Field

The disclosure relates to a pixel and a display device including the same.

2. Description of the Related Art

As information technology is developed, importance of a display device, which is a connection medium between a user and information, has been highlighted. In response to this, a use of a display device such as a liquid crystal display device and an organic light emitting display device is increasing.

The display device may display a predetermined image using pixels. A pixel includes a driving transistor, and includes a plurality of transistors and capacitors to compensate for a threshold voltage of the driving transistor. When a large number of transistors and capacitors are included in the pixel, applying the pixel to a high-resolution display device is difficult. Therefore, a pixel applicable to a high-resolution display device is required.

SUMMARY

A feature of the disclosure is to provide a pixel capable of compensating for a threshold voltage of a driving transistor and applicable to high-resolution, and a display device including the same.

According to embodiments of the disclosure, a pixel includes a light emitting element, a first transistor, a second transistor, a third transistor, and a fourth transistor. The first transistor has a first electrode connected to a first power line via a first node, a second electrode connected to a second power line via a second node and the light emitting element, and a gate electrode connected to a third node. The second transistor is connected between a data line and the third node, and has a gate electrode connected to a first scan line. The third transistor is connected between the first power line and the first node, and has a gate electrode connected to an emission control line. The fourth transistor is connected between the second node and a third power line. The second transistor is turned on after the fourth transistor is turned on and maintains a turn-on state during a predetermined period, and is turned off before the fourth transistor is turned off.

According to an embodiment, a gate electrode of the fourth transistor is connected to a second scan line.

According to an embodiment, a gate electrode of the fourth transistor is connected to the third power line.

According to an embodiment, the third transistor is turned off after the second transistor and the fourth transistor are turned on, and is turned on when the fourth transistor maintains the turn-on state after the second transistor is turned off.

According to an embodiment of the disclosure, a display device includes pixels positioned to be connected to first scan lines, data lines, emission control lines, any one of at least one first power line, any one of at least one second power line, and any one of at least one third power line. A specific pixel connected to an i-th, where "i" is a natural number, first scan line of the first scan lines and a j-th, where "j" is a natural number, data line of the data lines includes a light emitting element, a first transistor, a second transistor, a third transistor, and a fourth transistor. The first transistor has a first electrode connected to a first power line of the at least one first power line via a first node, a second electrode connected to a second power line of the at least one second power line via a second node and the light emitting element, and a gate electrode connected to a third node. The second transistor is connected between the j-th data line and the third node, and turned on when a first scan signal is supplied to the i-th first scan line. The third transistor is connected between the first power line and the first node, and turned off when an emission control signal is supplied to a k-th, where "k" is a natural number, emission control line of the emission control lines. The fourth transistor is connected between the second node and a third power line of the at least one third power line, and the second transistor is turned on after the fourth transistor is turned on and maintains a turn-on state during a predetermined period, and is turned off before the fourth transistor is turned off.

According to an embodiment, the display device further includes a scan driver, a data driver, an emission driver, and a power supply. The scan driver is for supplying the first scan signal to the first scan lines. The data driver is for supplying reference power and a data signal to the data lines. The emission driver is for supplying the emission control signal to the emission control lines. The power supply is for supplying a voltage of a first power to the first power line, a voltage of a second power to the second power line, and a voltage of an initialization power to the third power line.

According to an embodiment, the pixels are further connected to second scan lines, the scan driver supplies a second scan signal to the second scan lines, and the fourth transistor is turned on when the second scan signal is supplied to an i-th second scan line of the second scan lines.

According to an embodiment, the scan driver supplies a first scan signal to the i-th first scan line during the predetermined period after a second scan signal is supplied to the i-th second scan line, and stops supply of the second scan signal to the i-th second scan line after stopping supply of the first scan signal to the i-th first scan line.

According to an embodiment, the emission driver supplies the emission control signal to the k-th emission control line after the first scan signal and the second scan signal are supplied to the i-th first scan line and the i-th second scan line, respectively, and stops supply of the emission control signal to the k-th emission control line when the second scan signal is supplied to the i-th second scan line after supply of the first scan signal to the i-th first scan line is stopped.

According to an embodiment, the data driver supplies the reference power to the j-th data line during a partial period of a period in which the first scan signal is supplied to the i-th first scan line, and supplies the data signal during a remaining period except for the partial period.

According to an embodiment, a voltage of the reference power is set so that the first transistor is turned on.

According to an embodiment, the first power is set to a voltage higher than a voltage of the second power, and the voltage of the initialization power is set so that the light emitting element is turned off when the voltage of the initialization power is supplied to the second node.

According to an embodiment, a gate electrode of the fourth transistor is connected to the third power line.

According to an embodiment, the power supply supplies initialization power of the first voltage to the third power line when the first scan signal is supplied to the i-th first scan line, and supplies initialization power of the second voltage higher than the first voltage to the third power line after supply of the first scan signal to the i-th first scan line is stopped.

According to an embodiment, the third power line includes a plurality of sensing lines positioned parallel to the data lines, and the display device further comprises a sensing unit for driving the sensing lines.

According to an embodiment, the sensing unit supplies initialization power having a voltage between a voltage of a first power supplied to the first power line and a voltage of a second power supplied to the second power line through the sensing lines during a normal driving period in which an image is displayed in the pixels.

According to an embodiment, the sensing unit supplies the initialization power to the sensing lines during a partial period of a sensing period in which a characteristic of the first transistor is sensed, and stops supply of the initialization power to the sensing lines during a remaining period.

Features of the disclosure are not limited to the features described above, and other technical features which are not described will be clearly understood by those skilled in the art from the following description.

The pixel according to embodiments of the disclosure may compensate for a threshold voltage of a driving transistor using four transistors and one capacitor, and thus may be applied to a high-resolution display device.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings.

DETAILED DESCRIPTION OF THE EMBODIMENT

Figure 1:
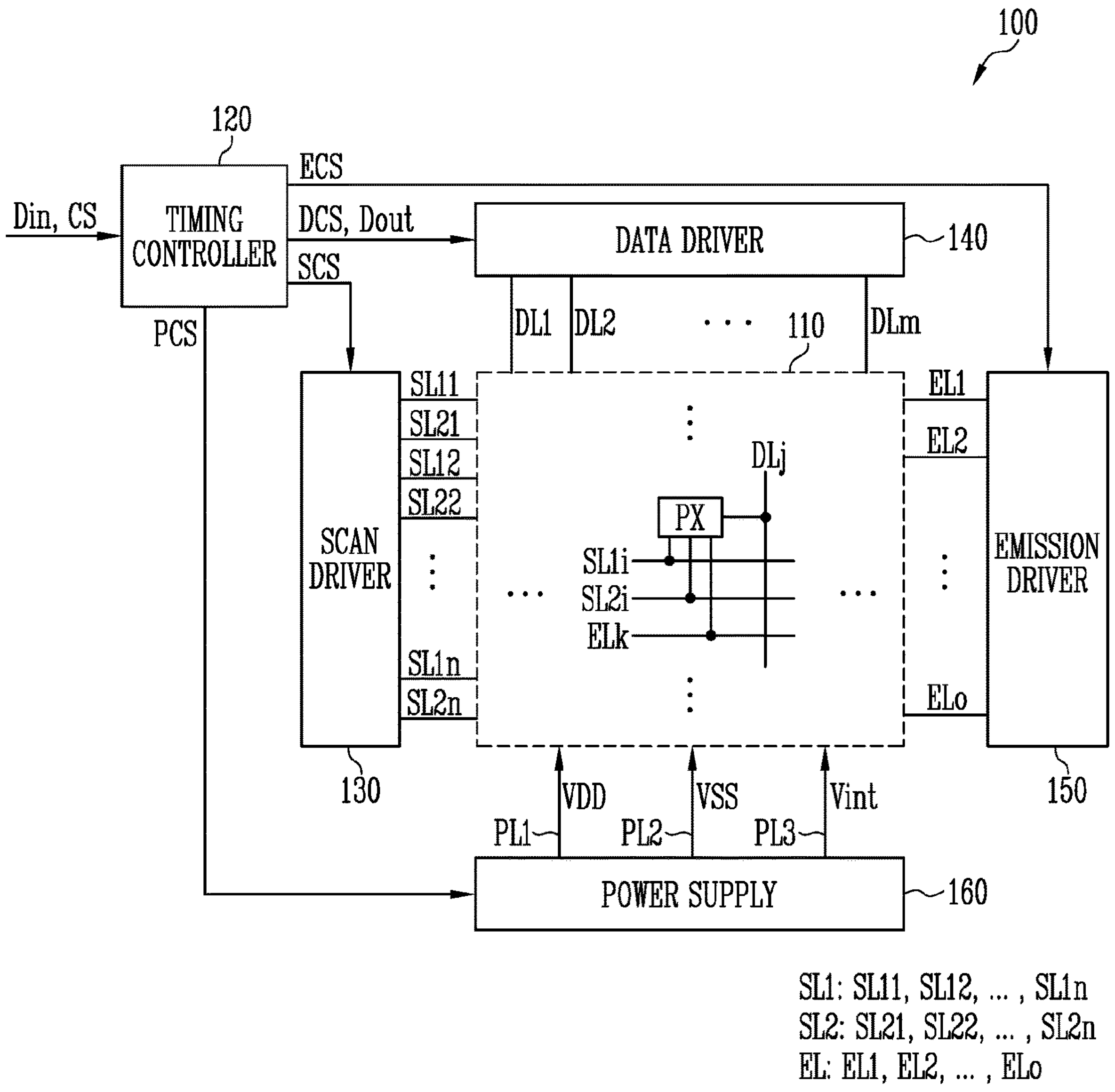
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device 100 according to an embodiment of the disclosure.

Referring to FIG. 1, the display device 100 according to an embodiment of the disclosure may include a pixel unit 110, a timing controller 120, a scan driver 130, a data driver 140, an emission driver 150, and a power supply 160. The above-described configurations may be implemented as separate integrated circuits, and two or more configurations among the above-described configurations may be integrated into one integrated circuit and implemented.

The pixel unit 110 may include pixels PX connected to first scan lines SL11, SL12, . . . , and SL1*n* (collectively first scan lines SL1), second scan lines SL21, SL22, . . . , and SL2*n* (collectively second scan lines SL2), data lines DL1, DL2, . . . , and DLm, emission control lines EL1, EL2, . . . , and Elo (collectively emission control lines EL), and power lines PL1, PL2, and PL3, where "n", "m", and "o" are natural numbers. For example, a pixel PXij, e.g., refer to FIG. 2, positioned on an i-th horizontal line (or pixel row) and a j-th vertical line (or pixel column) may be connected to an i-th first scan line SL1*i*, an i-th second scan line SL2*i*, and a j-th data line DLj, where "i" is a natural number equal to or less than "n", and "j" is a natural number equal to or less than "m".

When a first scan signal is supplied to the first scan lines SL11 to SL1*n*, the pixels PX may be selected in a horizontal line unit, for example, the pixels PX connected to the same scan line may be classified as one horizontal line (or pixel row), and the pixels PX selected by the first scan signal may be supplied with a data signal from a data line (any one of data lines DL1 to DLm) connected to the pixels PX. The pixels PX receiving the data signal may generate light of a predetermined luminance in response to a voltage of the data signal.

The scan driver 130 may receive a scan driving signal SCS from the timing controller 120. The scan driving signal SCS may include at least one scan start signal and clock signals necessary for driving the scan driver 130. The scan driver 130 may generate the first scan signal and a second scan signal while shifting the scan start signal in response to the clock signal.

For example, the scan driver 130 may generate the first scan signal while shifting a first scan start signal in response to the clock signal. The scan driver 130 may sequentially supply the first scan signal to the first scan lines SL11 to SL1*n*. The scan driver 130 may generate the second scan signal while shifting a second scan start signal in response to the clock signal. The scan driver 130 may sequentially supply the second scan signal to the second scan lines SL21 to SL2*n*. The first scan signal and the second scan signal may be set to a gate-on voltage so that a transistor included in the pixels PX is turned on.

For example, a first scan signal and a second scan signal of a low level may be supplied to a P-type transistor, and a first scan signal and a second scan signal of a high level may be supplied to an N-type transistor. A transistor receiving the first scan signal or the second scan signal may be turned on in response to the first scan signal or the second scan signal. Thereafter, a fact that the first scan signal or the second scan signal is supplied may mean that a gate-on voltage is supplied to the first scan line SL1 or the second scan line SL2. In addition, a fact that the first scan signal or the second scan signal is not supplied may mean that a gate-off voltage is supplied to the first scan line SL1 or the second scan line SL2.

Additionally, in FIG. 1, the first scan lines SL11 to SL1*n* and the second scan lines SL21 to SL2*n* are driven by one scan driver 130. However, in an embodiment, the first scan lines SL11 to SL1*n* and the second scan lines SL21 to SL2*n* may be driven by different scan drivers.

The data driver 140 may receive output data Dout and a data driving signal DCS from the timing controller 120. The data driving signal DCS may include a sampling signal and/or timing signals necessary for driving the data driver 140. The data driver 140 may generate a data signal based on the data driving signal DCS and the output data Dout. For example, the data driver 140 may generate an analog data signal based on a grayscale of the output data Dout. The data driver 140 may sequentially supply a voltage of reference power Vref and a voltage Vdata of the data signal to the data lines DL1 to DLm during one horizontal period 1H, e.g., refer to FIG. 3. The reference power Vref may be set to a constant voltage and may be set to a voltage lower than that of a first power VDD so that a driving transistor included in each of the pixels PX may be turned on.

The emission driver 150 may receive an emission driving signal ECS from the timing controller 120. The emission driving signal ECS may include an emission start signal and clock signals necessary for driving the emission driver 150. The emission driver 150 may generate an emission control signal while shifting the emission start signal in response to the clock signal.

For example, the emission driver 150 may sequentially supply the emission control signal to the emission control lines EL1 to ELo. The emission control signal may be set to a gate-off voltage so that the transistor included in the pixels PX may be turned off. For example, an emission control signal of a high level may be supplied to a P-type transistor, and an emission control signal of a low level may be supplied to an N-type transistor. A transistor receiving the emission control signal may be set to a turn-off state during a period in which the emission control signal is supplied. Thereafter, a fact that the emission control signal is supplied may mean that a gate-off voltage is supplied to the emission control line ELk.

The timing controller 120 may receive input data Din and a control signal CS from a host system through an interface. For example, the timing controller 120 may receive the input data Din and the control signal CS from at least one of a graphics processing unit (GPU), a central processing unit (CPU), and an application processor (AP) included in the host system. The control signal CS may include various signals including the clock signal.

The timing controller 120 may generate the scan driving signal SCS, the data driving signal DCS, the emission driving signal ECS, and a power driving signal PCS based on the control signal CS. The scan driving signal SCS, the data driving signal DCS, the emission driving signal ECS, and the power driving signal PCS may be supplied to the scan driver 130, the data driver 140, the emission driver 150, and the power supply 160, respectively.

The timing controller 120 may rearrange the input data Din according to a specification of the display device 100. In addition, the timing controller 120 may correct the input data Din to generate the output data Dout, and supply the output data Dout to the data driver 140. In an embodiment, the timing controller 120 may correct the input data Din in response to an optical measurement result measured in a process.

The power supply 160 may receive the power driving signal PCS from the timing controller 120. The power driving signal PCS may include switch control signals necessary for power generation. The power supply 160 may generate various powers necessary for driving the display device 100. For example, the power supply 160 may generate the first power VDD, a second power VSS, and an initialization power Vint.

The first power VDD may be power supplying a driving current to the pixels PX. The second power VSS may be power receiving a driving current from the pixels PX. During a period in which the pixels PX are set to an emission state, the first power VDD may be set to a voltage higher than a voltage of the second power VSS. The initialization power Vint may be power for initializing a light emitting element LD included in each of the pixels PX. A voltage of the initialization power Vint may be set to a voltage lower than the voltage of the first power VDD and equal to or higher than the voltage of the second power VSS. For example, the voltage of the initialization power Vint may be set so that the light emitting element LD is turned off when the initialization power Vint is supplied to an anode electrode of the light emitting element LD.

Figure 8:
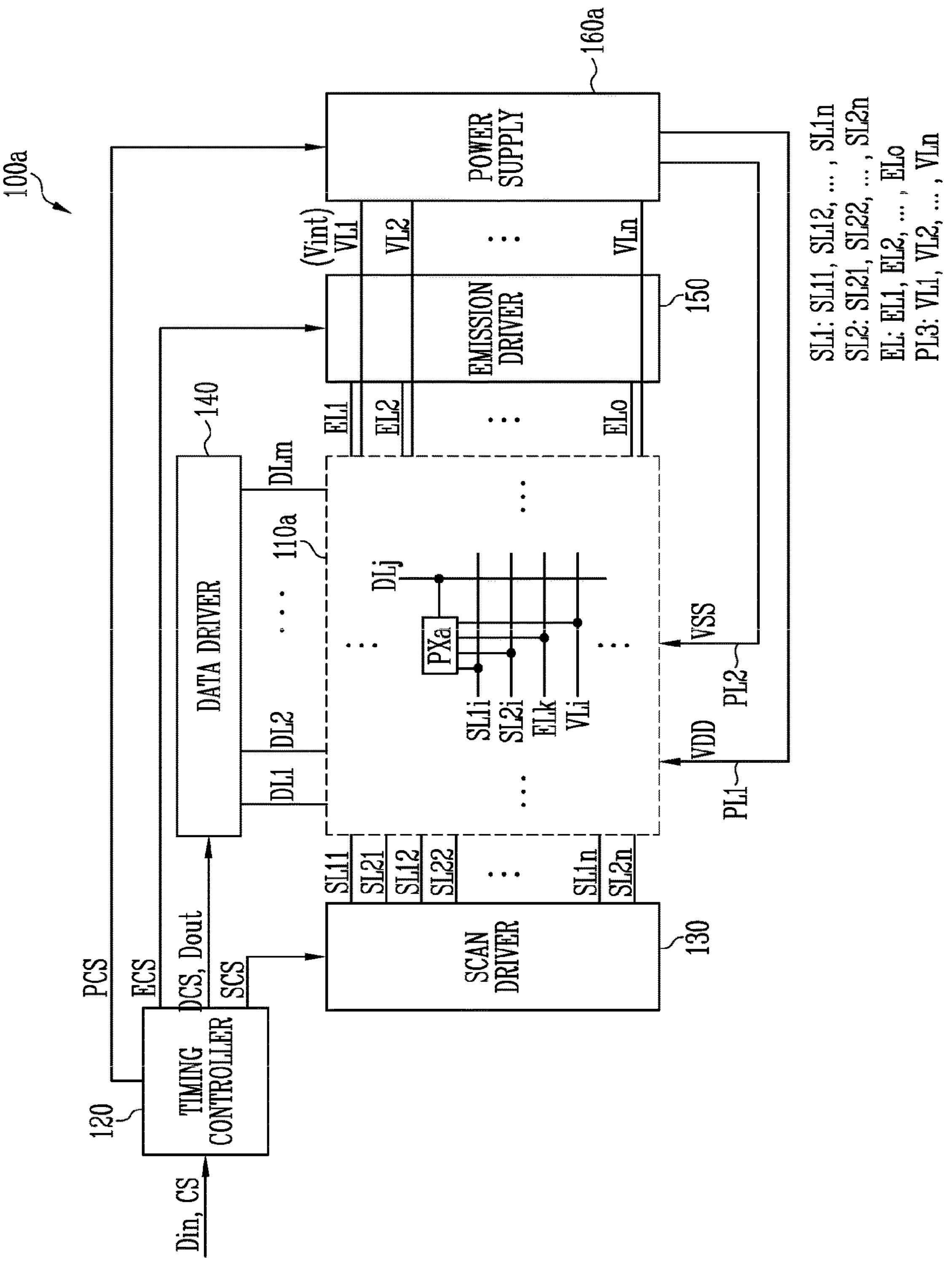
FIG. 8 is a diagram illustrating a display device according to an embodiment of the disclosure.

The first power VDD generated by the power supply 160 may be supplied to the first power line PL1 and the second power VSS may be supplied to the second power line PL2. In addition, the initialization power Vint generated by the power supply 160 may be supplied to the third power line PL3. The first power line PL1, the second power line PL2, and the third power line PL3 may be commonly connected to the pixels PX. However, in an embodiment, the third power line PL3 may include a plurality of power control lines VL1, VL2, . . . , and VLn as shown in FIG. 8, and the power control lines VL1 to VLn may be connected to the pixels PX in a horizontal line unit.

In an embodiment, the first power line PL1 may be configured of a plurality of power lines, the plurality of power lines may be connected to different pixels PX, the second power line PL2 may be configured of a plurality of power lines, and the plurality of power lines may be connected to different pixels PX. That is, in an embodiment of the disclosure, the pixels PX may be connected to any one of at least one first power line PL1, any one of at least one second power line PL2, and any one of at least one third power line PL3.

Figure 3:
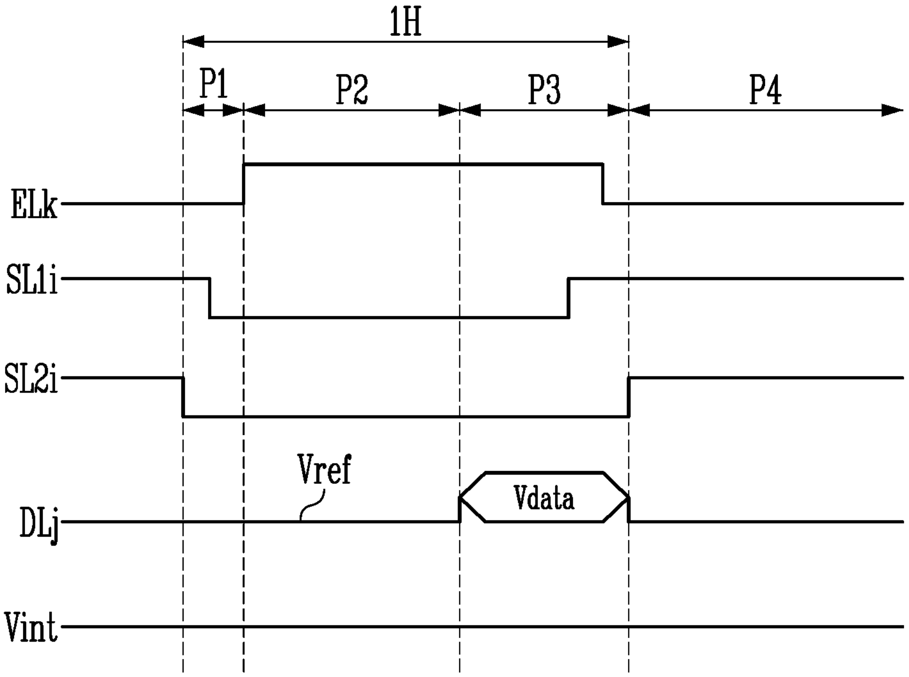
FIG. 3 is a diagram illustrating a method of driving a pixel according to an embodiment of the disclosure.
Figure 6:
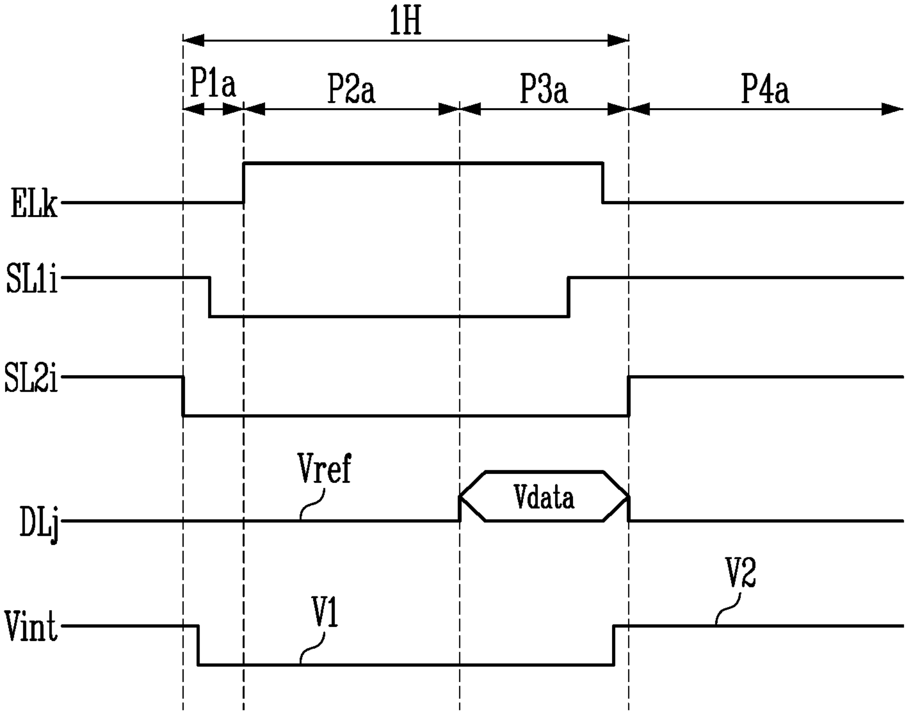
FIG. 6 is a diagram illustrating an embodiment of a driving method corresponding to the pixel shown in FIG. 2.

As shown in FIG. 3, the power supply 160 may supply the initialization power Vint of the constant voltage to the third power line PL3. In addition, as shown in FIG. 6, the power supply 160 may supply the initialization power Vint, which is changed to a first voltage V1 and a second voltage V2, to the third power line PL3.

Figure 2:
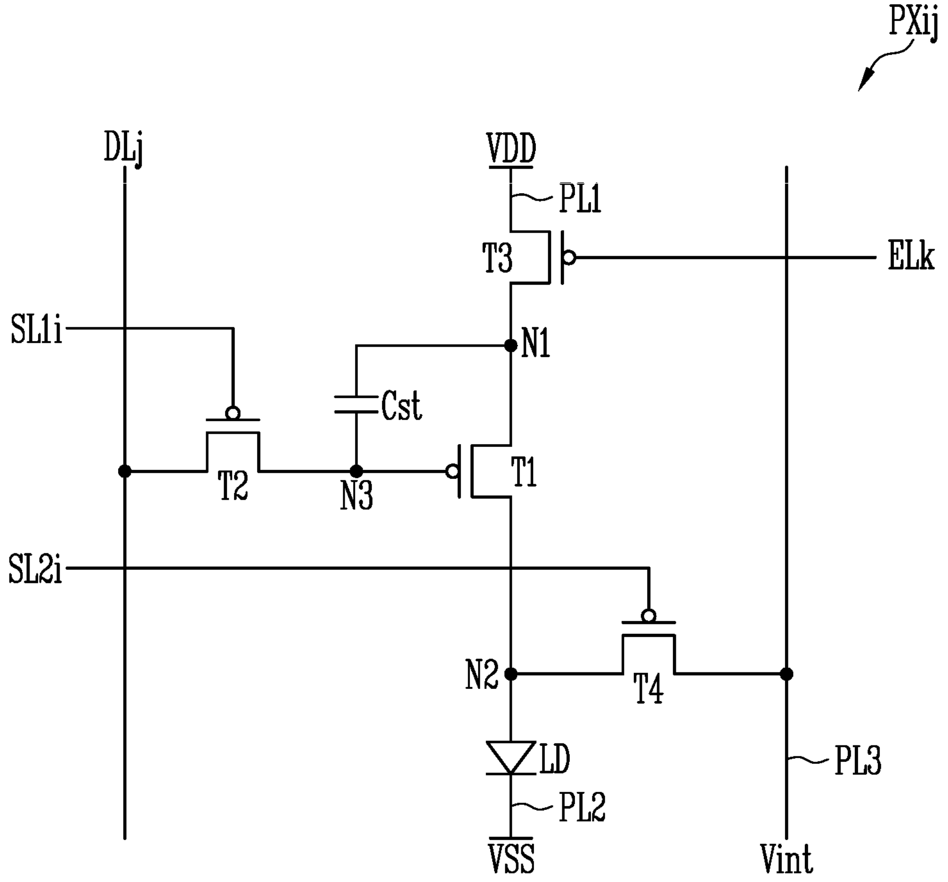
FIG. 2 is a diagram illustrating an embodiment of a pixel shown in FIG. 1.

FIG. 2 is a diagram illustrating an embodiment of the pixel shown in FIG. 1. In FIG. 2, the pixel PXij positioned on the i-th horizontal line and the j-th vertical line is shown.

Referring to FIG. 2, the pixel PXij may be connected to corresponding signal lines SL1*i*, SL2*i*, DLj, and ELk. For example, the pixel PXij may be connected to an i-th first scan line SL1*i*, an i-th second scan line SL2*i*, a j-th data line DLj, and k-th, where "k" is a natural number equal to or less than "o", emission control line ELk. In an embodiment, the pixel PXij may be further connected to the first power line PL1, the second power line PL2, and the third power line PL3.

The pixel PXij according to an embodiment of the disclosure may include the light emitting element LD and a pixel circuit for controlling a current amount supplied to the light emitting element LD.

The light emitting element LD may be connected between the first power line PL1 and the second power line PL2. For example, a first electrode, for example, the anode electrode, of the light emitting element LD may be connected to the first power line PL1 via a second node N2, a first transistor T1, a first node N1, and a third transistor T3. A second electrode, for example, a cathode electrode, of the light emitting element LD may be connected to the second power line PL2. The light emitting element LD may generate light of a predetermined luminance in response to a driving current supplied from the first power line PL1 to the second power line PL2 via the pixel circuit. To this end, the first power VDD supplied to the first power line PL1 may be set to a voltage higher than that of the second power VSS supplied to the second power line PL2.

The light emitting element LD may be selected as an organic light emitting diode. In addition, the light emitting element LD may be selected as an inorganic light emitting diode such as a micro light emitting diode (LED) or a quantum dot light emitting diode. In addition, the light emitting element LD may be an element in which an organic material and an inorganic material are combined. Although the pixel PXij is shown as including a single light emitting element LD in FIG. 2, in an embodiment, the pixel PXij may include a plurality of light emitting elements LD, and the plurality of light emitting elements LD may be connected in series, parallel or series-parallel to each other.

The pixel circuit may include the first transistor T1, a second transistor T2, the third transistor T3, a fourth transistor T4, and a first capacitor Cst.

In an embodiment, the first to fourth transistors T1 to T4 may be set as P-type transistors. However, this is an example, and at least one of the first to fourth transistors T1 to T4 may be replaced with an N-type transistor.

A first electrode of the first transistor T1 (or a driving transistor) may be connected to the first node N1, and a second electrode of the first transistor T1 may be connected to the second node N2. That is, the first electrode of the first transistor T1 may be connected to the first power line PL1 via the first node N1, and the second electrode may be connected to the second power line PL2 via the second node N2 and the light emitting element LD. A gate electrode of the first transistor T1 may be connected to the third node N3. The first transistor T1 may control the current amount supplied from the first power VDD to the second power VSS via the light emitting element LD in response to a voltage of the third node N3.

The second transistor T2 may be connected between the data line DLj and the third node N3. In addition, a gate electrode of the second transistor T2 may be connected to the first scan line SL1*i*. The second transistor T2 may be turned on when the first scan signal is supplied to the first scan line SL1*i* to electrically connect the data line DLj and the third node N3.

The third transistor T3 may be connected between the first power line PL1 and the first node N1. In addition, a gate electrode of the third transistor T3 may be connected to the emission control line ELk. The third transistor T3 may be turned off when the emission control signal is supplied to the emission control line ELk, and turned on when the emission control signal is not supplied. When the third transistor T3 is turned off, the first power line PL1 and the first node N1 may be electrically cut off, and thus the light emitting element LD may be set to a non-emission state.

The fourth transistor T4 may be connected between the second node N2 and the third power line PL3. In addition, a gate electrode of the fourth transistor T4 may be connected to the second scan line SL2*i*. The fourth transistor T4 may be turned on when the second scan signal is supplied to the second scan line SL2*i* to electrically connect the second node N2 and the third power line PL3. That is, when the fourth transistor T4 is turned on, the second node N2 may be initialized with the voltage of the initialization power Vint. In this case, a parasitic capacitor (not shown) of the light emitting element LD may be discharged, and thus black expression ability may be improved.

The first capacitor Cst may be connected between the first node N1 and the third node N3. The first capacitor Cst may store the data signal and a voltage corresponding to the threshold voltage of the first transistor T1.

FIG. 3 is a diagram illustrating a method of driving a pixel according to an embodiment of the disclosure. FIG. 3 shows a driving waveform supplied to the pixel PXij shown in FIG. 2.

Referring to FIG. 3, the pixel PXij according to an embodiment of the disclosure may be driven in a first period P1, a second period P2, a third period P3, and a fourth period P4 separately. Here, the first period P1, the second period P2, and the third period P3 may be included in one horizontal period 1H.

The first period P1 may be a period for initializing the first capacitor Cst. The first period P1 may be referred to as an initialization period. The second period P2 may be a period in which a voltage corresponding to the threshold voltage of the first transistor T1 is charged in the first capacitor Cst. The second period P2 may be referred to as a threshold voltage compensation period. The third period P3 may be a period in which the threshold voltage of the first transistor T1 and the voltage corresponding to the data signal are charged in the first capacitor Cst. The third period P3 may be referred to as a data writing and threshold voltage compensation period. The fourth period P4 may be a period in which the light emitting element LD emits light by the voltage stored in the first capacitor Cst. The fourth period P4 may be referred to as an emission period.

The data driver 140 may supply the voltage of the reference power Vref to the data line DLj during the first period P1 and the second period P2. The reference power Vref may be set to a voltage lower than the voltage of the first power VDD. The reference power Vref may be set to a voltage at which the first transistor T1 may be turned on. In addition, the data driver 140 may supply the voltage Vdata of the data signal to the data line DLj during the third period P3. The voltage Vdata of the data signal may be variously set in response to the grayscale.

The scan driver 130 may supply the first scan signal to the first scan line SL1*i* and supply the second scan signal to the second scan line SL2*i* during the first period P1 to the third period P3. The first scan signal may be set to completely overlap the second scan signal and have a width narrower than that of the second scan signal. For example, the first scan signal may be supplied after the second scan signal is supplied. For example, supply of the first scan signal may be stopped before supply of the second scan signal is stopped.

The emission driver 150 may supply the emission control signal to the emission control line ELk during the second period P2 to the third period P3.

FIGS. 4A to 4D are diagrams illustrating an operation process of the pixel corresponding to the driving waveform of FIG. 3.

Figure 4A:
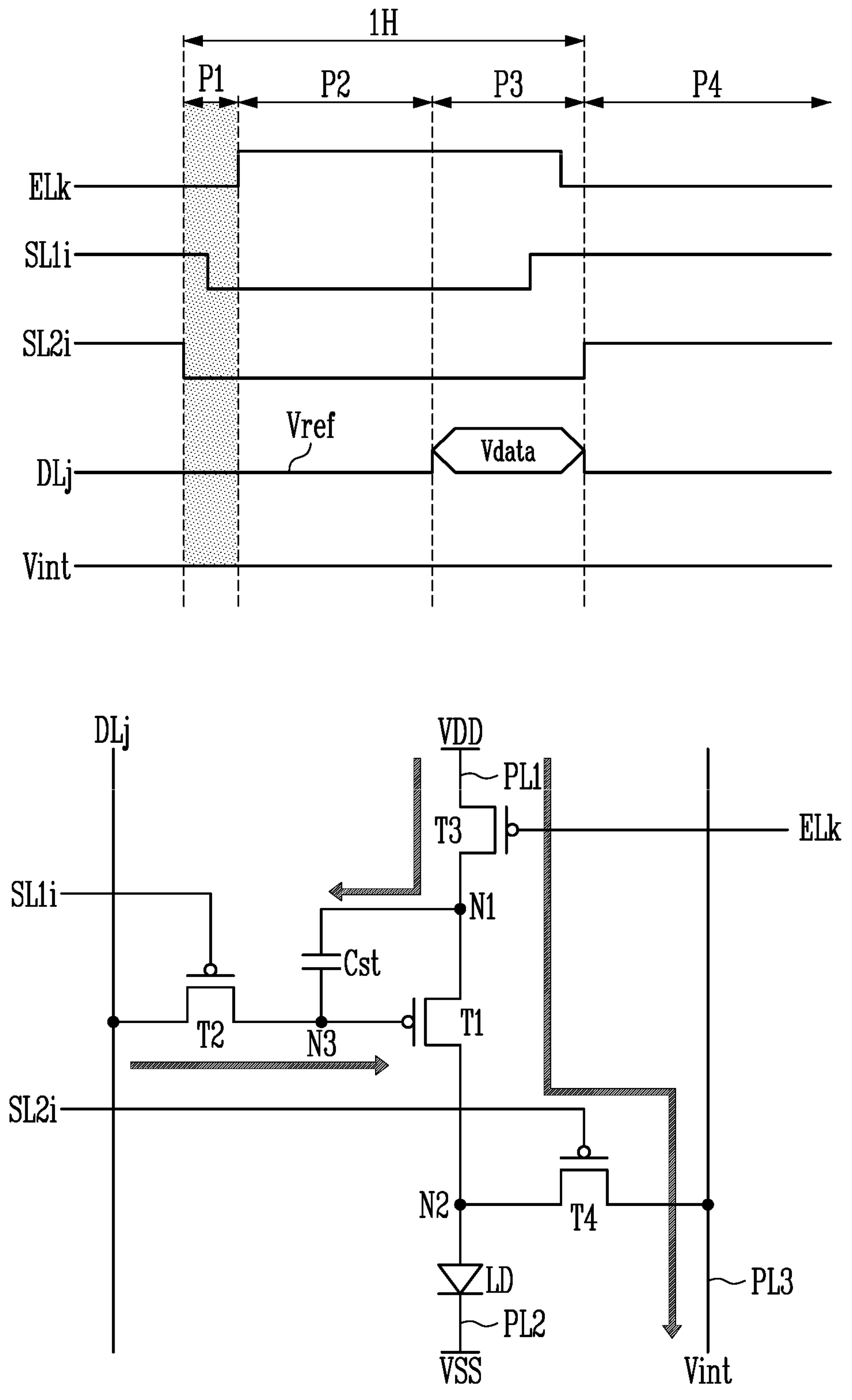
FIGS. 4A, 4B, 4C, and 4D are diagrams illustrating an operation process of the pixel corresponding to a driving waveform of FIG. 3.

Referring to FIG. 4A, during the first period P1, the fourth transistor T4 may be turned on in response to the second scan signal supplied to the second scan line SL2*i*. When the fourth transistor T4 is turned on, the third power line PL3 and the second node N2 may be electrically connected, and thus the voltage of the initialization power Vint may be supplied to the second node N2. When the voltage of the initialization power Vint is supplied to the second node N2, the first electrode of the light emitting element LD may be initialized with the voltage of the initialization power Vint. During the first period P1 to the third period P3 when the voltage of the initialization power Vint is set so that the light emitting element LD does not emit light, and thus the fourth transistor T4 is set to a turn-on state, the light emitting element LD may not emit light.

After the fourth transistor T4 is turned on, the second transistor T2 may be turned on in response to the first scan signal supplied to the first scan line SL1*i*. When the second transistor T2 is turned on, the data line DLj and the third node N3 may be electrically connected, and thus the voltage of the reference power Vref may be supplied to the third node N3 from the data line DLj.

During the first period P1, the emission control signal is not supplied to the emission control line ELk. Therefore, during the first period P1, the third transistor T3 may be set to a turn-on state.

The voltage of the reference power Vref may be set so that the first transistor T1 is turned on, and thus the first transistor T1 may be turned on. When the first transistor T1 is turned on, a current from the first power VDD may be supplied to the third power line PL3 via the fourth transistor T4. In an embodiment of the disclosure, by turning on the second transistor T2 after the fourth transistor T4 is turned on, an unnecessary current may be prevented from being supplied to the light emitting element LD.

Additionally, during the first period P1, the first node N1 is set to the voltage of the first power VDD, and the third node N3 is set to the voltage of the reference power Vref. Therefore, a voltage of a previous frame stored in the first capacitor Cst may be initialized during the first period P1.

Figure 4B:
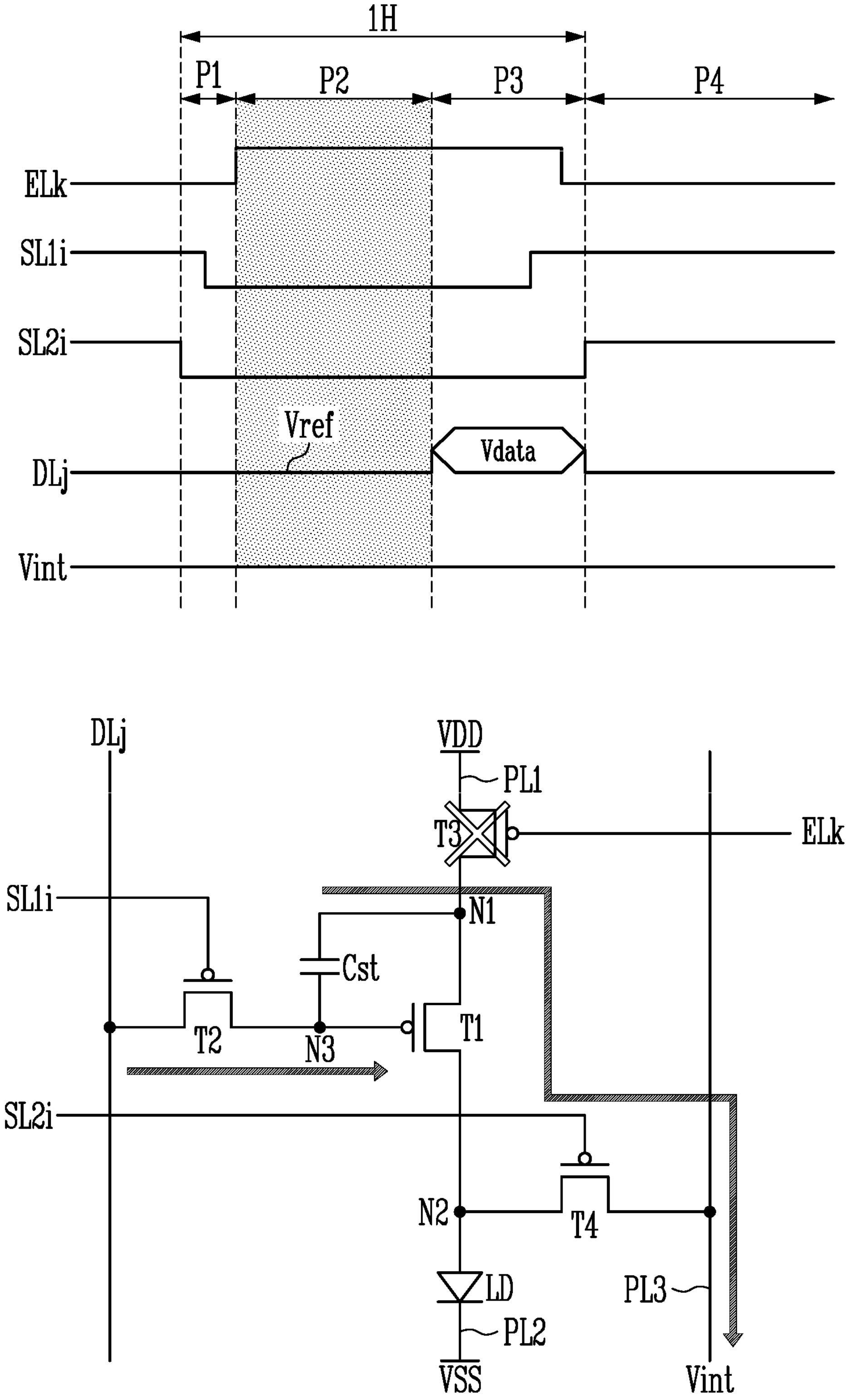

Referring to FIG. 4B, during a second period P2, the second transistor T2 may maintain a turn-on state by the first scan signal supplied to the first scan line SL1*i*, and thus the voltage of the reference power Vref may be supplied to the third node N3. During the second period P2, the fourth transistor T4 may maintain a turn-on state by the second scan signal supplied to the second scan line SL2*i*, and thus the second node N2 and the third power line PL3 may be electrically connected.

During the second period P2, the third transistor T3 may be turned off by the emission control signal supplied to the emission control line ELk. When the third transistor T3 is turned off, electrical connection between the first power line PL1 and the first node N1 is cut off. In this case, a voltage of the first node N1 may be decreased from the voltage of the first power VDD to a voltage obtained by adding the threshold voltage of the first transistor T1 to the reference power Vref.

That is, during the second period P2, the third node N3 may be set to the voltage of the reference power Vref, and the first node N1 may be set to a voltage obtained by adding the threshold voltage of the first transistor T1 to the voltage of the reference power Vref. Therefore, the voltage corresponding to the threshold voltage of the first transistor T1 may be stored in the first capacitor Cst during the second period P2.

Figure 4C:
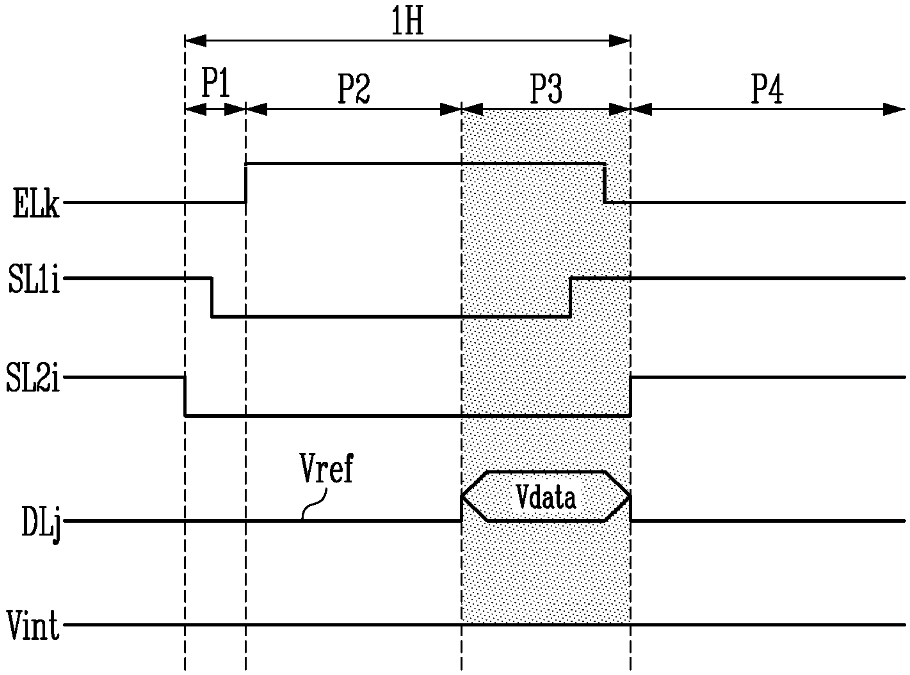
Figure 4C:
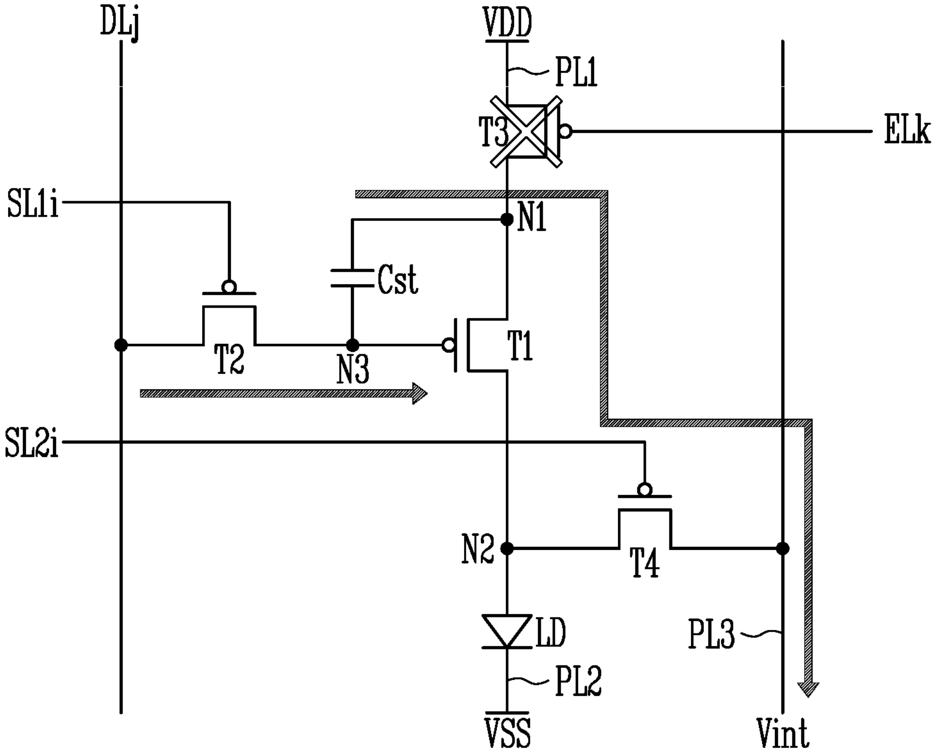

Referring to FIG. 4C, during the third period P3, the second transistor T2 may maintain the turn-on state by the first scan signal supplied to the first scan line SL1*i*, and thus the voltage Vdata of the data signal may be supplied to the third node N3. During the third period P3, the fourth transistor T4 may maintain the turn-on state by the second scan signal supplied to the second scan line SL2*i*, and thus the second node N2 and the third power line PL3 may be electrically connected. During the third period P3, the third transistor T3 may maintain a turn-off state by the emission control signal supplied to the emission control line ELk.

When the voltage Vdata of the data signal is supplied to the third node N3, the third node N3 may be changed from the voltage of the reference power Vref to the voltage Vdata of the data signal. That is, during the third period P3, the third node N3 may be set to the voltage Vdata of the data signal.

When the voltage of the third node N3 is changed to the voltage Vdata of the data signal, the voltage of the first node N1 may be set to a voltage obtained by adding the threshold voltage of the first transistor T1 to the voltage Vdata of the data signal by coupling of the first capacitor Cst. At this time, the voltage corresponding to the data signal and the threshold voltage of the first transistor T1 may be stored in the first capacitor Cst.

Additionally, during the third period P3, after supply of the first scan signal to the first scan line SL1*i* is stopped, supply of the emission control signal to the emission control line ELk may be stopped. In addition, after supply of the emission control signal to the emission control line ELk is stopped, supply of the second scan signal to the second scan line SL2*i* may be stopped. That is, during the third period P3, the second transistor T2 may be turned off, the third transistor T3 may be turned on, and the fourth transistor T4 may be turned off, sequentially.

Since the third transistor T3 maintains the turn-off state when the second transistor T2 is turned off, the first node N1 may be set to a floating state. Therefore, the voltage stored in the first capacitor Cst may not be changed by a kickback voltage or the like of the second transistor T2.

Since the fourth transistor T4 may maintain the turn-on state when the third transistor T3 is turned off, an unnecessary current may be prevented from being supplied to the light emitting element LD during a period in which the voltage of the first node N1 increases to the first power VDD. Thereafter, the fourth transistor T4 may be turned off, and thus the light emitting element LD may receive a desired driving current.

Figure 4D:
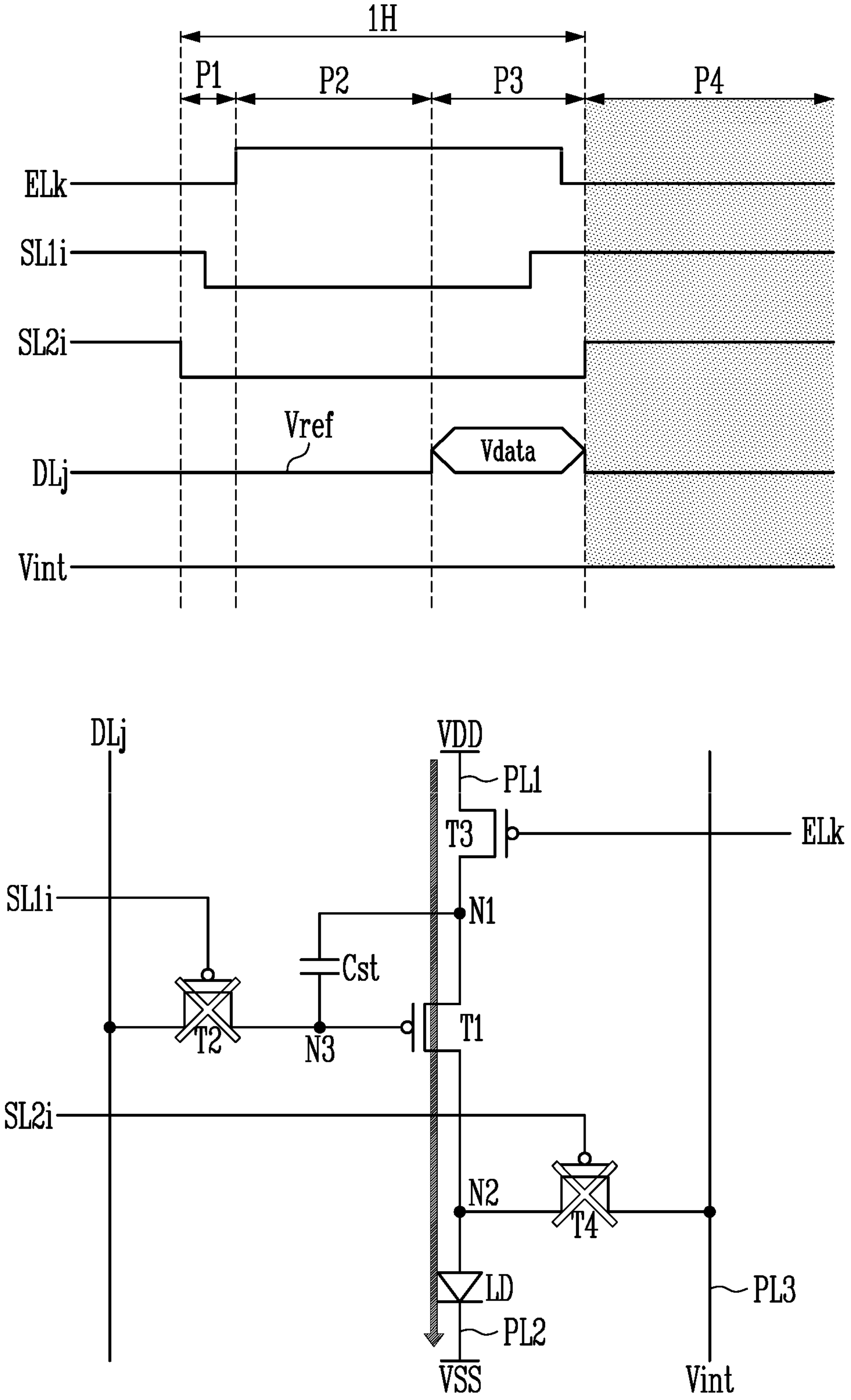

Referring to FIG. 4D, during the fourth period P4, the second transistor T2 and the fourth transistor T4 may be set to a turn-off state, and the third transistor T3 may be set to a turn-on state. When the third transistor T3 is turned on, the voltage of the first power VDD may be supplied to the first node N1. At this time, the first transistor T1 may supply the driving current corresponding to the voltage stored in the first capacitor Cst to the light emitting element LD, and the light emitting element LD may generate light of a luminance corresponding to the driving current.

For example, during the fourth period P4, the voltage of the first node N1 is changed to the voltage of the first power VDD from the voltage obtained by adding the threshold voltage of the first transistor T1 to the voltage Vdata of the data signal. In addition, the third node N3 may be set to a voltage obtained by subtracting a voltage variation amount of the first node N1 from the voltage Vdata of the data signal. For example, the voltage of the third node N3 may be set as in Equation 1.

$$VN3 = V\,\text{data} - (VDD - V\,\text{data} + V\,th) \qquad \text{[Equation 1]}$$

In Equation 1, VN3 may mean the voltage of the third node N3, Vdata may mean the voltage of the data signal, VDD may mean the voltage of the first power, and Vth may mean the threshold voltage of the first transistor T1.

When the voltage of the first node N1 is set as in Equation 1, the current supplied to the light emitting element LD may be determined by the first power VDD and the voltage Vdata of the data signal approximately. That is, the pixels PX according to an embodiment of the disclosure may control the current amount supplied to the light emitting element LD regardless of the threshold voltage of the first transistor T1, thereby improving uniformity of a luminance.

In addition, since the pixel PXij of the disclosure includes four transistors T1 to T4 and one capacitor Cst, that is, has a relatively simple structure, the pixel PXji may be applied to the high-resolution display device 100.

Figure 5:
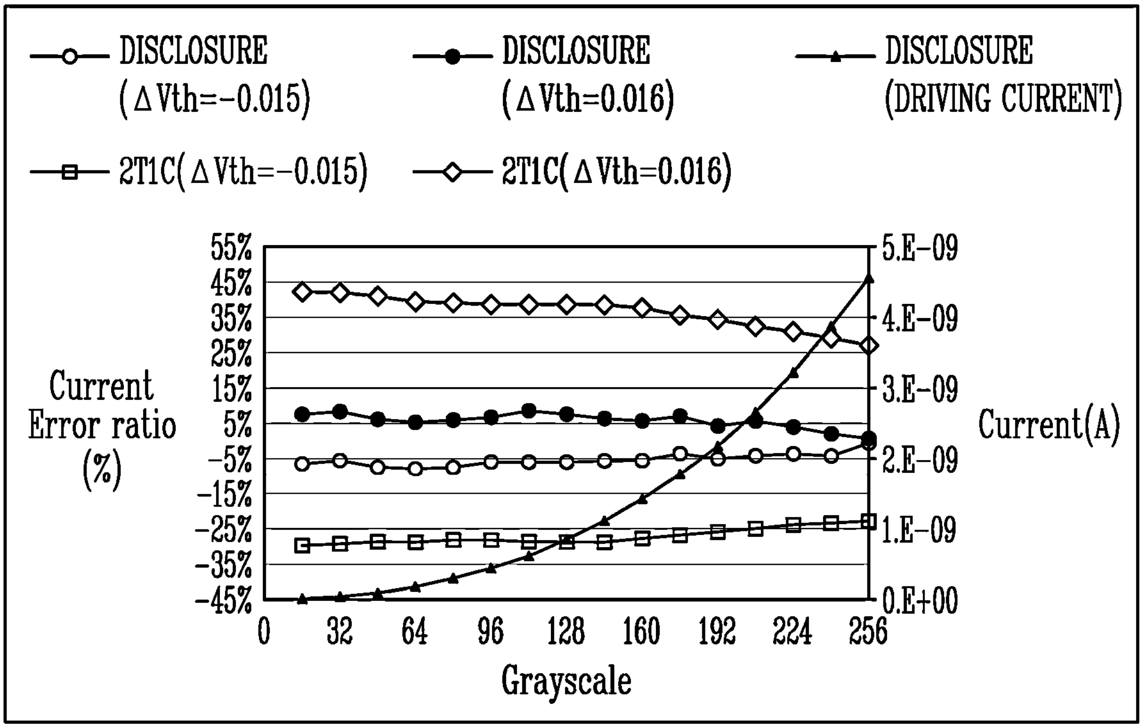
FIG. 5 is a diagram illustrating a driving current and a current deviation corresponding to the pixel shown in FIG. 2.

FIG. 5 is a diagram illustrating a driving current and a current deviation corresponding to the pixel PXij shown in FIG. 2. In FIG. 5, an X-axis may indicate a grayscale, a right Y-axis may indicate the driving current supplied to the light emitting element, and a left Y-axis may indicate the current deviation. In FIG. 5, the pixel PXij according to the embodiment of the disclosure shown in FIG. 2 is compared with a 2TR 1Cap pixel including only the first transistor T1, the second transistor T2, and the first capacitor Cst in FIG. 2.

Referring to FIG. 5, when a data signal corresponding to 0 grayscale (0 Gray) to 256 grayscale (256 Gray) is supplied to the pixel PXij according to an embodiment of the disclosure, the driving current is changed from 0.0 nA to about 4.6 nA approximately. That is, the driving current of the pixel PXij according to an embodiment of the disclosure is changed in response to the grayscale, and thus the pixel PXij may stably generate light of a luminance corresponding to the grayscale.

In addition, even in a case where the threshold voltage of the driving transistor (that is, the first transistor T1 of FIG. 2) is changed, the current deviation of the pixel PXij according to an embodiment of the disclosure may maintain a range of approximately ±5%. Compared to this, a current deviation of the pixel of 2TR 1Cap may have a range of approximately ±35%. That is, the pixel PXij according to an embodiment of the disclosure may stably compensate for the threshold voltage of the driving transistor compared to the 2TR 1Cap pixel. Here, the current deviation indicates an error rate of a current as a percentage (%).

FIG. 6 is a diagram illustrating an embodiment of a driving method corresponding to the pixel PXij shown in FIG. 2. When describing FIG. 6, a description overlapping that of FIGS. 3 to 4D is omitted.

Referring to FIGS. 2 and 6, the pixel PXij according to an embodiment of the disclosure may be driven in a first period P1*a*, a second period P2*a*, a third period P3*a*, and a fourth period P4*a* separately. The first period P1*a*, the second period P2*a*, and the third period P3*a* may be included in one horizontal period 1H.

The voltage of the initialization power Vint may be set to the first voltage V1 during the first period P1*a*, the second period P2*a*, and the third period P3*a* included in one horizontal period 1H, and may be set to the second voltage V2 during the fourth period P4*a*.

The initialization power Vint of the first voltage V1 may be supplied to the first electrode of the light emitting element LD during the first period P1*a*, the second period P2*a*, and the third period P3*a*. To this end, a voltage value of the first voltage V1 may be set so that the light emitting element LD is turned off. In addition, the first voltage V1 of the initialization power Vint may be set to a voltage value lower than the first power VDD so that a current flows from the first node N1 to the third power line PL3 during the first period P1*a*, the second period P2*a*, and the third period P3*a*.

The initialization power Vint of the second voltage V2 may be supplied during the fourth period P4*a*, and thus the initialization power Vint of the second voltage V2 may not be supplied to the pixel PXij. The second voltage V2 may be set to a voltage value higher than the first voltage V1 in order to prevent a leakage current from being supplied from the second node N2 to the third power line PL3 during the fourth period P4*a*. For example, the second voltage V2 may be set to substantially the same voltage as the first power VDD.

Figure 7:
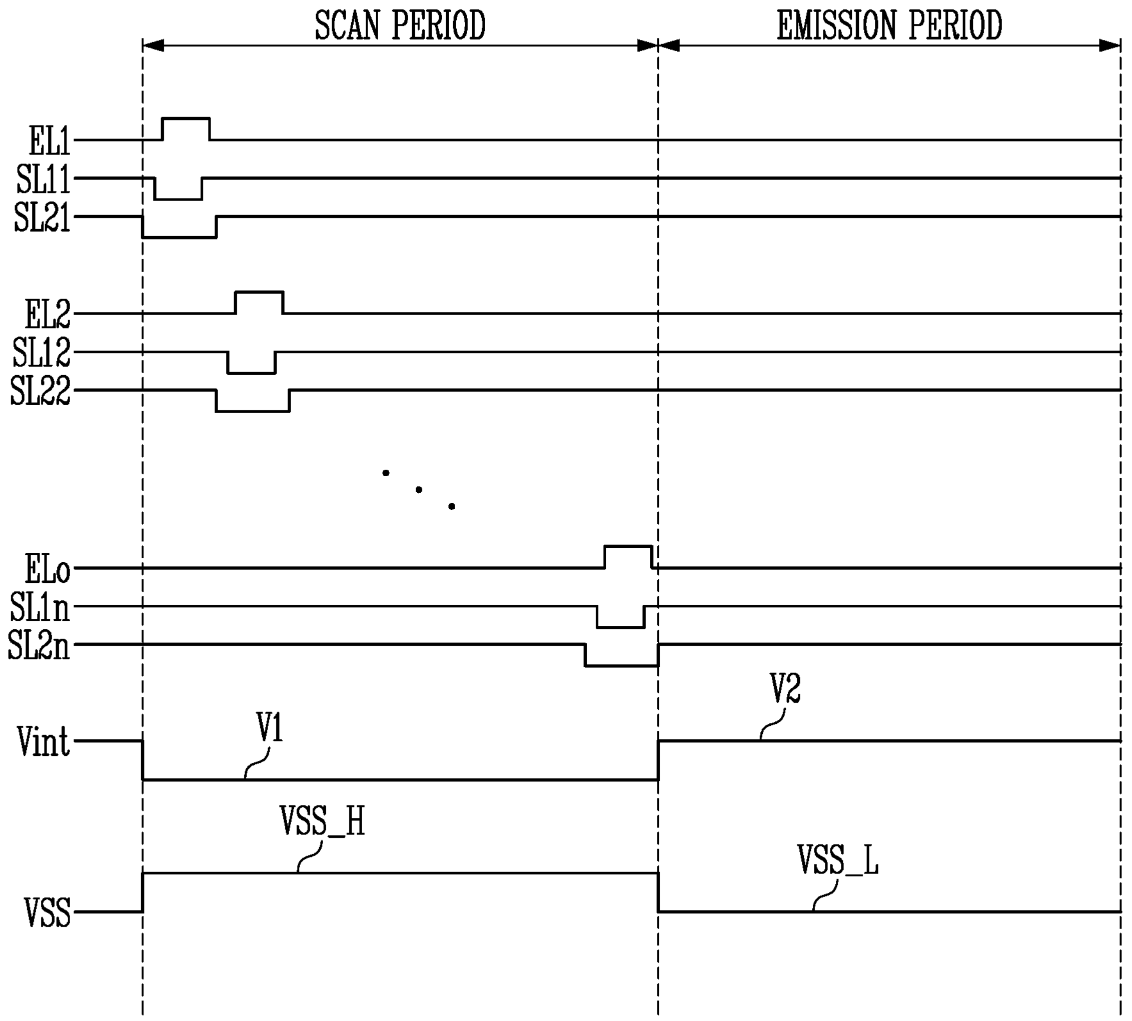
FIG. 7 is a diagram illustrating an embodiment of a driving waveform supplied to the pixels when the display device is driven in a simultaneous driving method.

FIG. 7 is a diagram illustrating an embodiment of a driving waveform supplied to the pixels when the display device is driven in a simultaneous driving method. In FIG. 7, a waveform is shown on an assumption that the emission control lines EL1 to ELo are formed for each horizontal line (that is, n=o).

Referring to FIGS. 1, 2, 6, and 7, in the simultaneous driving method, one frame may be divided into a scan period and an emission period and driven.

The scan period is a period in which the voltage Vdata of the data signal is supplied to the pixels PX. During the scan period, the scan driver 130 may sequentially supply the first scan signal to the first scan lines SL11 to SL1*n* and sequentially supply the second scan signal to the second scan lines SL21 to SL2*n*. The emission driver 150 may sequentially supply the emission control signal to the emission control lines EL1 to ELo. The data driver 140 may supply the reference power Vref and the data signal to the data lines DL1 to DLm to be synchronized with the first scan signal (or the second scan signal).

The power supply 160 may supply the initialization power Vint of the first voltage V1 to the third power line PL3 during the scan period and supply the initialization power Vint of the second voltage V2 during the emission period. In this case, the third power line PL3 may be commonly connected to the pixels PX and changed to the first voltage V1 and the second voltage V2. In addition, during the emission period, the third power line PL3 may be set to the second voltage V2, and thus a leakage current from the pixels PX to the third power line PL3 may be minimized.

The power supply 160 may supply second power VSS_H of a high voltage to the second power line PL2 during the scan period and supply second power VSS_L of a low voltage during the emission period. The second power VSS_H of the high voltage may be set so that the driving current is not supplied from the first transistor T1 included in each of the pixels PX to the second power line PL2 via the light emitting element LD, that is, the light emitting element LD does not emit light. For example, the second power VSS_H of the high voltage may be set to be similar to or equal to the voltage of the first power VDD.

The second power VSS_L of the low voltage may be set so that the driving current may be supplied from the first transistor T1 included in each of the pixels PX to the second power line PL2 via the light emitting element LD, that is, the light emitting element LD may emit light. To this end, the second power VSS_L of the low voltage may be set to a voltage lower than that of the first power VDD.

Figure 9:
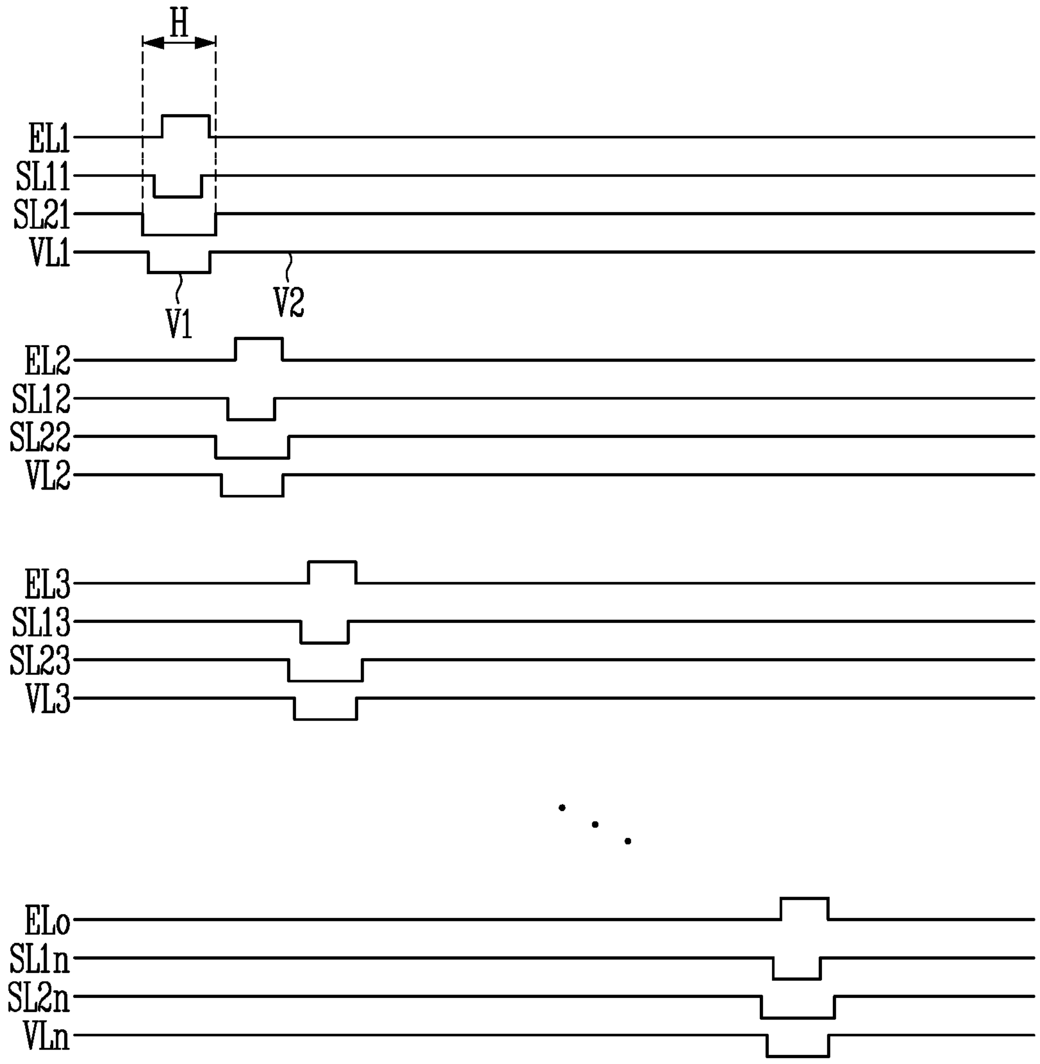
FIG. 9 is a diagram illustrating an embodiment of a driving waveform supplied to the pixels when the display device of FIG. 8 is driven in a sequential driving method.

FIG. 8 is a diagram illustrating a display device 100*a* according to an embodiment of the disclosure. FIG. 9 is a diagram illustrating an embodiment of a driving waveform supplied to the pixels when the display device 100*a* of FIG. 8 is driven in a sequential driving method. In FIG. 9, a waveform is shown on an assumption that the emission control lines EL1 to ELo are formed for each horizontal line.

Referring to FIGS. 8 and 9, the display device 100*a* according to an embodiment of the disclosure may include a pixel unit 110*a*, the timing controller 120, the scan driver 130, the data driver 140, the emission driver 150, and a power supply 160*a*.

The pixel unit 110*a* may include pixels PXa connected to first scan lines SL11 to SL1*n*, second scan lines SL21 to SL2*n*, emission control lines EL1 to ELo, and power control lines VL1, VL2, . . . , and VLn.

The power supply 160*a* may receive the power driving signal PCS from the timing controller 120. The power driving signal PCS may include switch control signals necessary for power generation. The power 160*a* may generate various powers necessary for driving the display device 100*a*. For example, the power supply 160*a* may generate the first power VDD, the second power VSS, and the initialization power Vint.

The first power VDD generated by the power supply 160*a* may be supplied to the first power line PL1. The first power line PL1 may be commonly connected to the pixels PX, and may supply the voltage of the first power VDD to the pixels PX.

The second power VSS generated by the power supply 160*a* may be supplied to the second power line PL2. The second power line PL2 may be connected to the pixels PX and may supply the voltage of the second power VSS to the pixels PX. The power supply 160*a* may supply the second power VSS to maintain a fixed voltage (constant voltage) during one frame period in correspondence with the sequential driving method. Here, the second power VSS may be set to a voltage lower than a voltage of the first power VDD.

The initialization power Vint generated by the power supply 160*a* may be supplied to the third power line PL3. The third power line PL3 may include the plurality of power control lines VL1, VL2, . . . , and VLn, and the power control lines VL1 to VLn may be connected to the pixels PX in horizontal line unit.

The first power control line VL1 may be positioned on a first horizontal line and may be electrically connected to pixels positioned on the first horizontal line. The second power control line VL2 may be positioned on a second horizontal line and may be electrically connected to pixels positioned on the second horizontal line. The n-th power control line VLn may be positioned on an n-th horizontal line and may be electrically connected to pixels positioned on the n-th horizontal line.

The power supply 160*a* may sequentially supply the initialization power Vint of the first voltage V1 to be synchronized with the first scan signal (or the second scan signal). For example, during a horizontal period 1H in which the first scan signal is supplied to the first scan line SL11, the initialization power Vint supplied to the first power control line VL1 may be set to the first voltage V1, and after supply of the first scan signal to the first scan line SL11 is stopped, the initialization power Vint supplied to the first power control line VL1 may be set to the second voltage V2.

Here, as described above, the second voltage V2 may be set to a voltage higher than that of the first voltage V1, and thus a leakage current may be prevented from being supplied from the pixel positioned on the first horizontal line to the first power control line VL1.

The power supply 160*a* may sequentially supply the initialization power Vint of the first voltage V1 to the first power control line VL1 to the n-th power control line VLn to be synchronized with the first scan signal (or the second scan signal). In addition, the initialization power Vint of the second voltage V2 higher than the first voltage V1 may be supplied during a period except for a period in which the first voltage V1 is supplied.

As described above, the pixel according to an embodiment of the disclosure may stably compensate for the threshold voltage of the driving transistor (that is, the first transistor T1) while including a relatively simple circuit structure, and thus the pixel may be applied to the high-resolution display devices 100 and 100*a*. In addition, the pixel according to an embodiment of the disclosure may minimize a leakage current while controlling the voltage of the initialization power Vint, and thus may stably implement a luminance.

Figure 10:
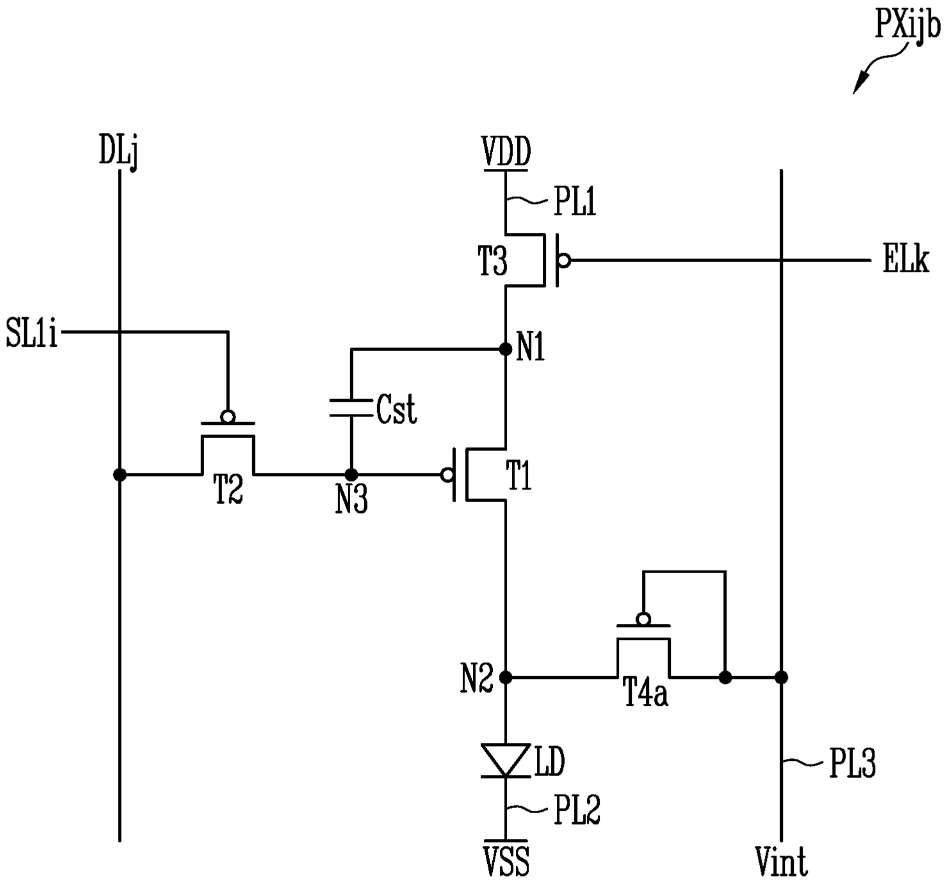
FIG. 10 is a diagram illustrating a pixel according to an embodiment of the disclosure.
Figure 11:
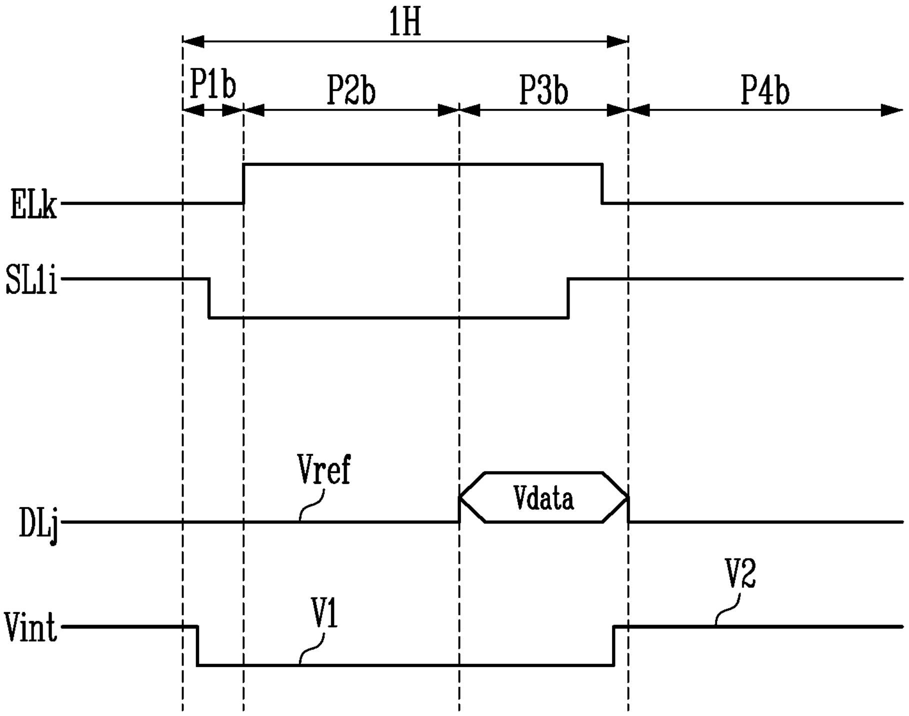
FIG. 11 is a diagram illustrating an embodiment of a method of driving the pixel shown in FIG. 10.

FIG. 10 is a diagram illustrating a pixel PXijb according to an embodiment of the disclosure. In FIG. 10, the pixel PXijb positioned on the i-th horizontal line and the j-th vertical line is shown. When describing FIG. 10, the same configuration as that of FIG. 2 is briefly described. FIG. 11 is a diagram illustrating an embodiment of a method of driving the pixel shown in FIG. 10.

Referring to FIG. 10, the pixel PXijb according to an embodiment of the disclosure may include the light emitting element LD and a pixel circuit for controlling the current amount supplied to the light emitting element LD.

The light emitting element LD may generate light of a predetermined luminance in response to the driving current supplied from the pixel circuit.

The pixel circuit may include the first transistor T1, the second transistor T2, the third transistor T3, a fourth transistor T4*a*, and the first capacitor Cst.

The first transistor T1 may be connected between the first node N1 and the second node N2, and a gate electrode may be connected to the third node N3. The first transistor T1 may control the current amount supplied from the first power VDD to the second power VSS via the light emitting element LD in response to the voltage of the third node N3.

The second transistor T2 may be connected between the data line DLj and the third node N3, and a gate electrode may be connected to the first scan line SL1*i*. The second transistor T2 may be turned on when the first scan signal is supplied to the first scan line SL1*i* to electrically connect the data line DLj and the third node N3.

The third transistor T3 may be connected between the first power line PL1 and the first node N1, and a gate electrode may be connected to the emission control line ELk. The third transistor T3 may be turned off when the emission control signal is supplied to the emission control line ELk, and turned on when the emission control signal is not supplied.

The fourth transistor T4*a* may be connected between the second node N2 and the third power line PL3, and a gate electrode may be connected to the third power line PL3. That is, the fourth transistor T4*a* may be connected in a diode form so that a current may be supplied from the second node N2 to the third power line PL3.

That is, the pixel PXijb shown in FIG. 10 may have the same configuration as the pixel PXij shown in FIG. 2 except that the fourth transistor T4*a* is connected in the diode form. When the fourth transistor T4*a* is connected in the diode form, the second scan line SL2*i* may be removed compared to FIG. 2.

The first capacitor Cst may be connected between the first node N1 and the third node N3.

Referring to FIG. 11, the pixel PXijb according to an embodiment of the disclosure may be driven in a first period P1*b*, a second period P2*b*, a third period P3*b*, and a fourth period P4*b* separately. Here, the first period P1*b*, the second period P2*b*, and the third period P3*b* may be included in one horizontal period 1H.

During the first period P1*b*, the second period P2*b*, and the third period P3*b*, the initialization power Vint may be set to the first voltage V1, and during the fourth period P4*b*, the initialization power Vint may be set to the second voltage V2. Here, the first voltage V1 may be set to a low voltage so that a current flows from the second node N2 to the third power line PL3 and the second voltage V2 is set to a high voltage, for example, a voltage equal to or similar to that of the first power VDD, so that a current does not flow from the second node N2 to the third power line PL3. In this case, during the first period P1*b*, the second period P2*b*, and the third period P3*b*, the fourth transistor T4*a* may be set to a turn-on state, and during the fourth period P4*b*, the fourth transistor T4*a* may be set to a turn-off state.

During the first period P1*b*, the first scan signal may be supplied to the first scan line SL1*i*, and thus the second transistor T2 may be turned on. When the second transistor T2 is turned on, the data line DLj and the third node N3 may be electrically connected, and thus the voltage of the reference power Vref may be supplied to the third node N3 from the data line DLj.

The voltage of the reference power Vref may be set so that the first transistor T1 is turned on, and thus the first transistor T1 may be turned on. When the first transistor T1 is turned on, a current from the first power VDD may be supplied to the third power line PL3 via the fourth transistor T4.

During the second period P2*b*, the third transistor T3 may be turned off by the emission control signal supplied to the emission control line ELk. When the third transistor T3 is turned off, electrical connection between the first power line PL1 and the first node N1 is cut off. In this case, the voltage of the first node N1 may be decreased from the voltage of the first power VDD to a voltage obtained by adding the threshold voltage of the first transistor T1 to the reference power Vref.

During the third period P3*b*, the voltage Vdata of the data signal from the data line DLj may be supplied to the third node N3. When the voltage Vdata of the data signal is supplied to the third node N3, the third node N3 may be changed from the voltage of the reference power Vref to the voltage Vdata of the data signal. In this case, the voltage of the first node N1 may be set to a voltage obtained by adding the threshold voltage of the first transistor T1 to the voltage Vdata of the data signal.

During the fourth period P4*b*, supply of the first scan signal to the first scan line SL1*i* is stopped and the second transistor T2 is set to a turn-off state. In addition, the fourth transistor T4*a* is turned off by the initialization power Vint of the second voltage V2 supplied to the third power line PL3.

During the fourth period P4, supply of the emission control signal to the emission control line ELk may be stopped, and thus the third transistor T3 may be turned on. At this time, the first transistor T1 may supply the driving current from the first power VDD to the second power VSS via the light emitting element LD in response to the voltage of the third node N3, and the light emitting element LD may generate light of a luminance corresponding to the driving current.

Figure 12:
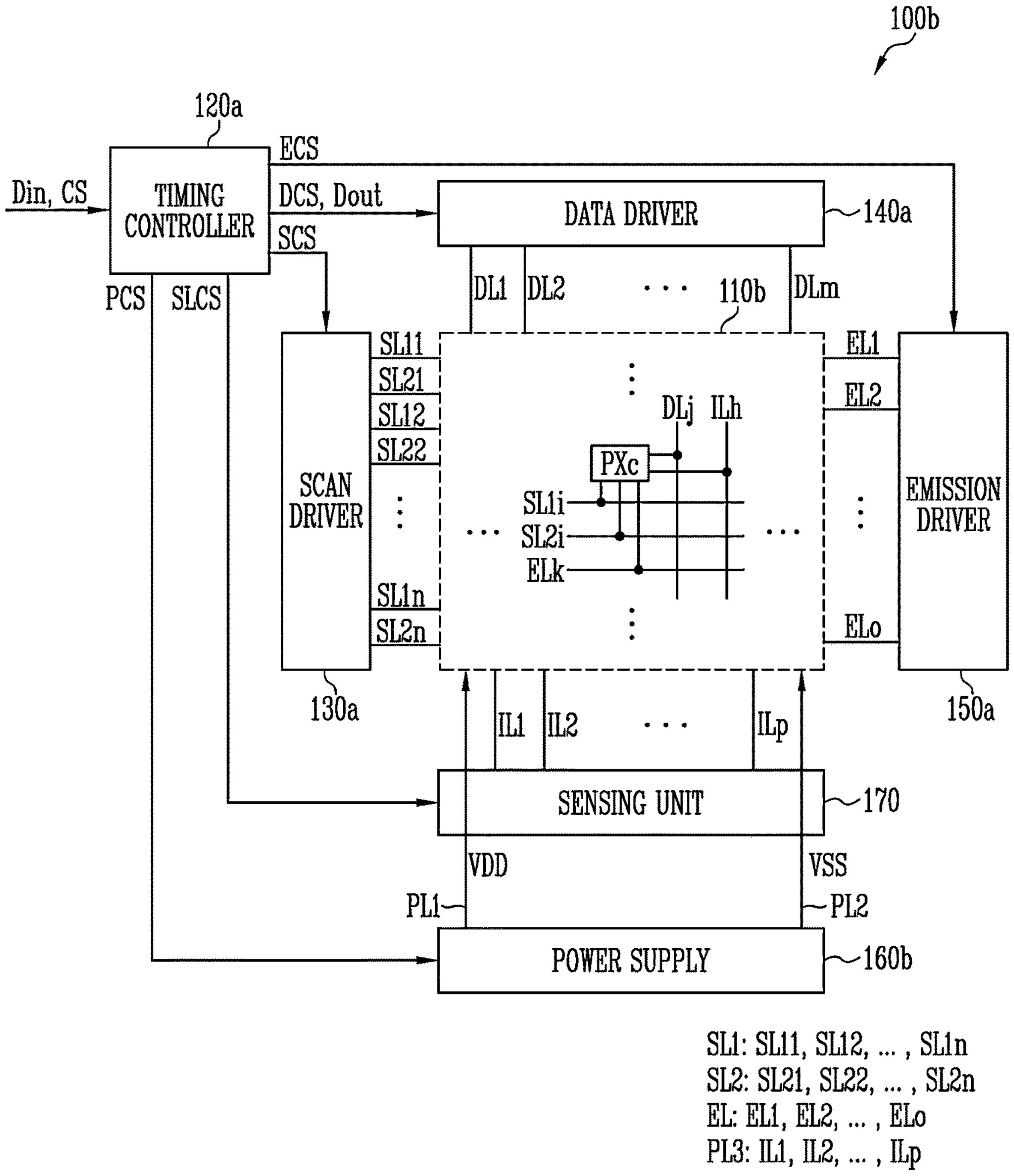
FIG. 12 is a diagram illustrating a display device according to an embodiment of the disclosure.

FIG. 12 is a diagram illustrating a display device 100*b* according to an embodiment of the disclosure. When describing FIG. 12, a description overlapping that of the same configuration as that of FIGS. 1 and 8 is omitted.

Referring to FIG. 12, the display device 100*b* according to an embodiment of the disclosure may include a pixel unit 110*b*, a timing controller 120*a*, a scan driver 130*a*, a data driver 140*a*, an emission driver 150*a*, a power supply 160*b*, and a sensing unit 170.

The pixel unit 110*b* may include pixels PXc connected to the first scan lines SL11 to SL1*n*, the second scan lines SL21 to SL2*n*, the emission control lines EL1 to ELo, and sensing lines IL1, IL2, . . . , ILp, where "p" is a natural number.

The sensing lines IL1 to ILp may be formed in the same direction as the data lines DL1 to DLm, for example, in a vertical line (or pixel column) direction. The sensing lines IL1 to ILp may be described as the third power line PL3 that is formed in the vertical line direction. In this case, the third power line PL3 receives the voltage of the initialization power Vint from the sensing unit 170.

The scan driver 130*a* may sequentially supply the first scan signal to the first scan lines SL11 to SL1*n* and sequentially supply the second scan signal to the second scan lines SL21 to SL2*n* during a normal driving period in which an image is displayed in the pixel unit 110*b*. For example, the scan driver 130*a* may supply the first scan signal and the second scan signal to the scan lines SL11 to SL1*n* and SL21 to SL2*n* as shown in the driving waveform shown in FIG. 3.

Figure 14:
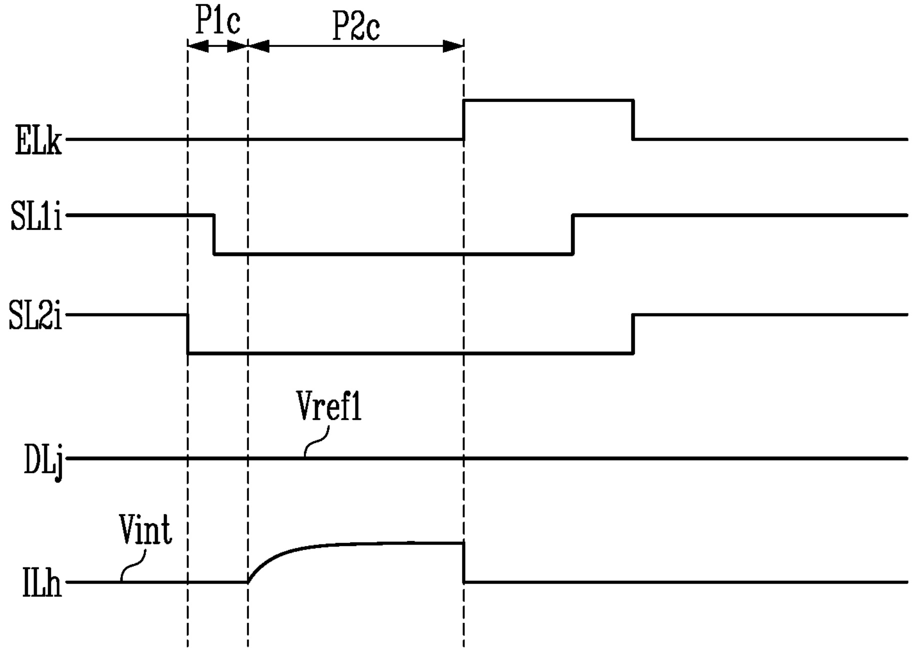
FIG. 14 is a diagram illustrating an embodiment of a driving waveform supplied to the pixel of FIG. 13 during a sensing driving period.

The scan driver 130*a* may supply the first scan signal to at least one first scan line (at least one of SL11 to SL1*n*) and supply the second scan signal to at least one second scan line (at least one of SL21 to SL2*n*) as shown in FIG. 14 during a sensing driving period in which a characteristic of at least one pixel included in the pixel unit 110*b* is sensed. For example, the sensing driving period may be included in an on period in which power is supplied to the display device 100*b* or an off period in which power is stopped, and the scan driver 130*a* may sequentially supply the first scan signal to the first scan lines SL11 to SL1*n* and sequentially supply the second scan signal to the second scan lines SL21 to SL2*n*.

The emission driver 150*a* may sequentially supply the emission control signals to the emission control lines EL1 to ELo during the normal driving period. For example, the emission driver 150*a* may supply the emission control signal to the emission control lines EL1 to ELo as shown in the driving waveform shown in FIG. 3.

The emission driver 150*a* may supply the emission control signal to at least one emission control line (any one of EL1 to ELo) as shown in FIG. 14 during the sensing driving period. For example, the emission driver 150*a* may sequentially supply the emission control signal to the emission control lines EL1 to ELo during the sensing driving period. Additionally, a supply time point of the emission control signal may be controlled so that the first scan signal and the second scan signal may sufficiently overlap during the sensing driving period.

The data driver 140*a* may sequentially supply the reference power Vref and the data signal to the data lines DL1 to DLm during the normal driving period. For example, the data driver 140*a* may supply the reference power Vref and the voltage Vdata of the data signal to the data lines DL1 to DLm during one horizontal period 1H as shown in FIG. 3.

The data driver 140*a* may supply the voltage of the first reference power Vref1 to the data lines DL1 to DLm during the sensing drive period, as shown in FIG. 14. The voltage of the first reference power Vref1 may be set so that a driving transistor included in each of the pixels PXc may be turned on. The voltage of the first reference power Vref1 may be equal to or different from that of the reference power Vref.

The power supply 160*b* may generate various powers necessary for driving the display device 100*b*. For example, the power supply 160*b* may generate the first power VDD and the second power VSS. The first power VDD generated by the power supply 160*b* may be supplied to the first power line PL1, and the second power VSS may be supplied to the second power line PL2.

The sensing unit 170 drives the sensing lines IL1 to ILp in response to a sensing driving signal SLCS received from the timing controller 120*a*. For example, the sensing unit 170 may supply the voltage of the initialization power Vint to the sensing lines IL1 to ILp during the normal driving period. In this case, the pixels PXc may be driven by the driving waveform of FIG. 3 during the normal driving period.

The sensing unit 170 may supply the voltage of the initialization power Vint to the sensing lines IL1 to ILp during a partial period of the sensing driving period and receive a sensing voltage from the sensing lines IL1 to ILp during a remaining period. The sensing voltage may include characteristic information, for example, a threshold voltage, of a driving transistor included in each of the pixels PXc. The sensing unit 170 receiving the sensing voltage may change an analog sensing voltage into digital sensing data and supply the digital sensing data to the timing controller 120*a*.

The timing controller 120*a* controls the scan driver 130*a*, the data driver 140*a*, the emission driver 150*a*, the power supply 160*b*, and the sensing unit 170. To this end, the timing controller 120*a* may supply the scan driving signal SCS, the data driving signal DCS, the emission driving signal ECS, the power driving signal PCS, and the sensing driving signal SLCS to the scan driver 130*a*, the data driver 140*a*, the emission driver 150*a*, the power supply 160*b*, and the sensing unit 170, respectively.

The timing controller 120*a* may generate the output data Dout by correcting the input data Din in response to the sensing data supplied from the sensing unit 170 during the sensing driving period. Here, the timing controller 120*a* may generate the output data Dout to compensate for the characteristic of the driving transistor included in each of the pixels PXc in response to the sensing data.

Figure 13:
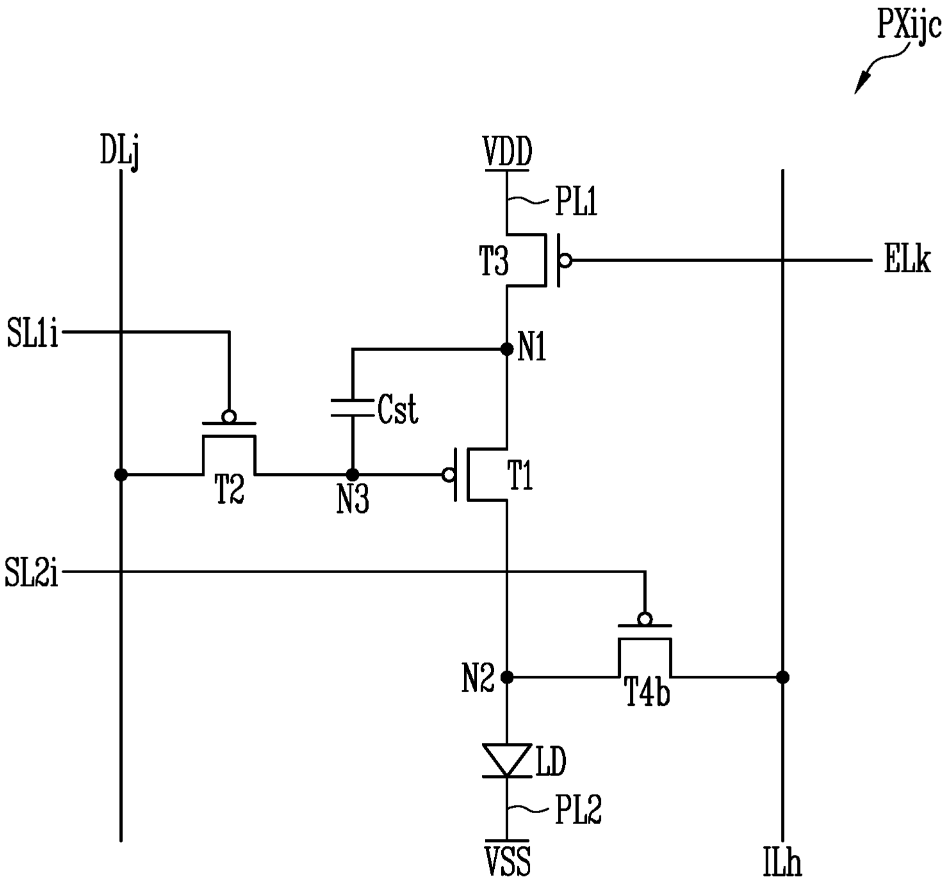
FIG. 13 is a diagram illustrating an embodiment of a pixel shown in FIG. 12.

FIG. 13 is a diagram illustrating an embodiment of the pixel PXc shown in FIG. 12. FIG. 13 shows the pixel PXijc positioned on the i-th horizontal line and the j-th vertical line. When describing FIG. 13, a description overlapping that of a configuration similar to or equal to that of FIG. 2 is omitted. FIG. 14 is a diagram illustrating an embodiment of a driving waveform supplied to the pixel PXijc of FIG. 13 during the sensing driving period.

Referring to FIG. 13, the pixel PXijc according to an embodiment of the disclosure may include the light emitting element LD and a pixel circuit for controlling the current amount supplied to the light emitting element LD.

The light emitting element LD may generate light of a predetermined luminance in response to the driving current supplied from the pixel circuit.

The pixel circuit may include the first transistor T1, the second transistor T2, the third transistor T3, a fourth transistor T4*b*, and the first capacitor Cst.

The fourth transistor T4*b* may be connected to the second node N2 and a sensing line ILh, where "h" is a natural number equal to or less than "p". In addition, a gate electrode of the fourth transistor T4*b* may be connected to the second scan line SL2*i*. The fourth transistor T4*b* may be turned on when the second scan signal is supplied to the second scan line SL2*i* to electrically connect the second node N2 and the sensing line ILh.

During the normal driving period, the voltage of the initialization power Vint shown in FIG. 3 may be supplied to the sensing line ILh. A driving method of the pixel PXijc during the normal driving period may be the same as that of FIGS. 2 and 3, and thus a detailed description thereof is omitted.

Referring to FIG. 14, the sensing driving period may be driven by being divided into a first period Plc and a second period P2*c*. The first period Plc may be set as a period in which the voltage of the first reference power Vref1 is supplied to the third node N3, and the second period P2*c* may be set as a period in which the sensing unit 170 receives the sensing voltage.

During the first period P1*c* and the second period P2*c*, the emission control signal is not supplied to the emission control line ELk, and thus the third transistor T3 is set to a turn-on state. During the first period P1*c*, the first scan signal may be supplied to the first scan line SL1*i* and the second scan signal may be supplied to the second scan line SL2*i*. When the first scan signal is supplied to the first scan line SL1*i*, the second transistor T2 may be turned on, and when the second scan signal is supplied to the second scan line SL2*i*, the fourth transistor T4*b* may be turned on.

When the second transistor T2 is turned on, the voltage of the first reference power Vref1 may be supplied to the third node N3 from the data line DLj. At this time, the first capacitor Cst may store a voltage corresponding to a difference voltage between the first power VDD and the first reference power Vref1.

When the fourth transistor T4*b* is turned on, the voltage of the initialization power Vint may be supplied to the second node N2 via the sensing line ILh. Therefore, the second node N2 may be initialized with the voltage of the initialization power Vint during the first period P1*c*.

Thereafter, during the second period P2*c*, supply of the initialization power Vint to the sensing line ILh may be stopped. When supply of the voltage of the initialization power Vint to the sensing line ILh is stopped, a voltage of the second node N2 may increase to a predetermined voltage corresponding to the driving current supplied from the first transistor T1, and at this time, the voltage applied to the second node N2 may be set as the sensing voltage. The sensing unit 170 may change the sensing voltage applied to the second node N2 to the sensing data and supply the sensing data to the timing controller 120.

In an embodiment, while the above-described process is repeated during the sensing driving period, the sensing data of the pixels PXc included in the pixel unit 110 may be stored in the timing controller 120*a*. The timing controller 120*a* may compensate for the first transistor T1 included in each of the pixels PXc by using the sensing data.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A pixel comprising:

a light emitting element;

a first transistor having a first electrode connected to a first power line via a first node, a second electrode connected to a second power line via a second node and the light emitting element, and a gate electrode directly connected to a third node;

a second transistor directly connected between a data line and the third node, and having a gate electrode connected to a first scan line;

a third transistor directly connected between the first power line and the first node, and having a gate electrode connected to an emission control line; and a fourth transistor directly connected between the second node and a third power line, wherein the first electrode of the first transistor is directly connected to the first node and the second electrode of the first transistor is directly connected to the second node, and the second transistor is turned on after the fourth transistor is turned on and maintains a turn-on state during a predetermined period, and is turned off before the fourth transistor is turned off.

2. The pixel according to claim 1, wherein a gate electrode of the fourth transistor is connected to a second scan line.

3. The pixel according to claim 1, wherein a gate electrode of the fourth transistor is connected to the third power line.

4. The pixel according to claim 1, wherein the third transistor is turned off after the second transistor and the fourth transistor are turned on, and is turned on when the fourth transistor maintains the turn-on state after the second transistor is turned off.

5. A display device comprising:

pixels positioned to be connected to first scan lines, data lines, emission control lines, any one of at least one first power line, any one of at least one second power line, and any one of at least one third power line, wherein a specific pixel connected to an i-th, where "i" is a natural number, first scan line of the first scan lines and a j-th, where "j" is a natural number, data line of the data lines comprises:

a light emitting element;

a first transistor having a first electrode connected to a first power line of the at least one first power line via a first node, a second electrode connected to a second power line of the at least one second power line via a second node and the light emitting element, and a gate electrode directly connected to a third node;

a second transistor directly connected between the j-th data line and the third node, and turned on when a first scan signal is supplied to the i-th first scan line;

a third transistor directly connected between the first power line and the first node, and turned off when an emission control signal is supplied to a k-th, where "k" is a natural number, emission control line of the emission control lines; and a fourth transistor directly connected between the second node and a third power line of the at least one third power line, wherein the first electrode of the first transistor is directly connected to the first node and the second electrode of the first transistor is directly connected to the second node, and the second transistor is turned on after the fourth transistor is turned on and maintains a turn-on state during a predetermined period, and is turned off before the fourth transistor is turned off.

6. The display device according to claim 5, further comprising:

a scan driver for supplying the first scan signal to the first scan lines;

a data driver for supplying reference power and a data signal to the data lines;

an emission driver for supplying the emission control signal to the emission control lines; and a power supply for supplying a voltage of a first power to the first power line, a voltage of a second power to the second power line, and a voltage of an initialization power to the third power line.

7. The display device according to claim 6, wherein the pixels are further connected to second scan lines, the scan driver supplies a second scan signal to the second scan lines, and the fourth transistor is turned on when the second scan signal is supplied to an i-th second scan line of the second scan lines.

8. The display device according to claim 7, wherein the scan driver supplies a first scan signal to the i-th first scan line during the predetermined period after a second scan signal is supplied to the i-th second scan line, and stops supply of the second scan signal to the i-th second scan line after stopping supply of the first scan signal to the i-th first scan line.

9. The display device according to claim 8, wherein the emission driver supplies the emission control signal to the k-th emission control line after the first scan signal and the second scan signal are supplied to the i-th first scan line and the i-th second scan line, respectively, and stops supply of the emission control signal to the k-th emission control line when the second scan signal is supplied to the i-th second scan line after supply of the first scan signal to the i-th first scan line is stopped.

10. The display device according to claim 6, wherein the data driver supplies the reference power to the j-th data line during a partial period of a period in which the first scan signal is supplied to the i-th first scan line, and supplies the data signal during a remaining period except for the partial period.

11. The display device according to claim 10, wherein a voltage of the reference power is set so that the first transistor is turned on.

12. The display device according to claim 6, wherein the first power is set to a voltage higher than a voltage of the second power, and the voltage of the initialization power is set so that the light emitting element is turned off when the voltage of the initialization power is supplied to the second node.

13. The display device according to claim 12, wherein a gate electrode of the fourth transistor is connected to the third power line.

14. The display device according to claim 6, wherein the power supply supplies initialization power of the first voltage to the third power line when the first scan signal is supplied to the i-th first scan line, and supplies initialization power of the second voltage higher than the first voltage to the third power line after supply of the first scan signal to the i-th first scan line is stopped.

15. The display device according to claim 5, wherein the third power line includes a plurality of sensing lines positioned parallel to the data lines, and the display device further comprises a sensing unit for driving the sensing lines.

16. The display device according to claim 15, wherein the sensing unit supplies an initialization power having a voltage between a voltage of a first power supplied to the first power line and a voltage of a second power supplied to the second power line through the sensing lines during a normal driving period in which an image is displayed in the pixels.

17. The display device according to claim 16, wherein the sensing unit supplies the initialization power to the sensing lines during a partial period of a sensing period in which a characteristic of the first transistor is sensed, and stops supply of the initialization power to the sensing lines during a remaining period.

* * * * *